(12) United States Patent
Sukegawa et al.

(10) Patent No.: US 7,954,373 B2
(45) Date of Patent: Jun. 7, 2011

(54) THERMAL TYPE FLOW METER

(75) Inventors: Yoshihiro Sukegawa, Hitachi (JP);
Noboru Tokuyasu, Hitachinaka (JP);
Hiroaki Hoshika, Hitachiomiya (JP);
Shiro Yamaoka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 12/432,323

(22) Filed: Apr. 29, 2009

(65) Prior Publication Data
US 2009/0272187 A1     Nov. 5, 2009

(30) Foreign Application Priority Data

Apr. 30, 2008     (JP) ................................. 2008-119121

(51) Int. Cl.
*G01F 1/68* (2006.01)
(52) U.S. Cl. .................. 73/204.27; 73/204.26
(58) Field of Classification Search .................. None
See application file for complete search history.

(56) References Cited

U.S. PATENT DOCUMENTS

| | | | |
|---|---|---|---|
| 4,587,842 A | 5/1986 | Handtmann | |
| 6,487,904 B1 * | 12/2002 | Myhre | 73/204.12 |
| 6,871,537 B1 * | 3/2005 | Gehman et al. | 73/204.26 |
| 2004/0168513 A1 * | 9/2004 | Aoshima et al. | 73/204.21 |
| 2007/0227260 A1 * | 10/2007 | Ike et al. | 73/861 |
| 2008/0295575 A1 | 12/2008 | Tokuyasu et al. | |
| 2008/0295590 A1 | 12/2008 | Sukegawa et al. | |
| 2009/0090177 A1 | 4/2009 | Sukegawa et al. | |

FOREIGN PATENT DOCUMENTS

| | | |
|---|---|---|
| DE | 199 48 135 A1 | 4/2001 |
| EP | 1 845 345 A2 | 10/2007 |
| JP | 59-136620 A | 8/1984 |
| JP | 10-142249 A | 5/1998 |
| JP | 2007-248136 A | 9/2007 |
| JP | 2007-285756 A | 11/2007 |
| JP | 2008-032501 A | 2/2008 |
| JP | 2008-292330 A | 12/2008 |
| JP | 2008-298425 A | 12/2008 |
| WO | WO 03/016833 A1 | 2/2003 |

OTHER PUBLICATIONS

European Search Report dated Aug. 14, 2009 (Three (3) pages).

* cited by examiner

*Primary Examiner* — Harshad Patel
(74) *Attorney, Agent, or Firm* — Crowell & Moring LLP

(57) ABSTRACT

There is provided a thermal type flow meter capable of accurately detecting a flow rate even when a fluid temperature varies rapidly or when the fluid temperature is high. A probe includes: a first main heating resistor; a second main heating resistor set at a temperature different from that of the first main heating resistor; and a sub-heating resistor for heating lead wires of the two main heating resistors. A CPU of a sensor control circuit finds a fluid temperature by using the two main heating resistors, and finds a fluid flow rate by using at least one of the two main heating resistors.

11 Claims, 14 Drawing Sheets

FIG. 15A
FIG. 15B
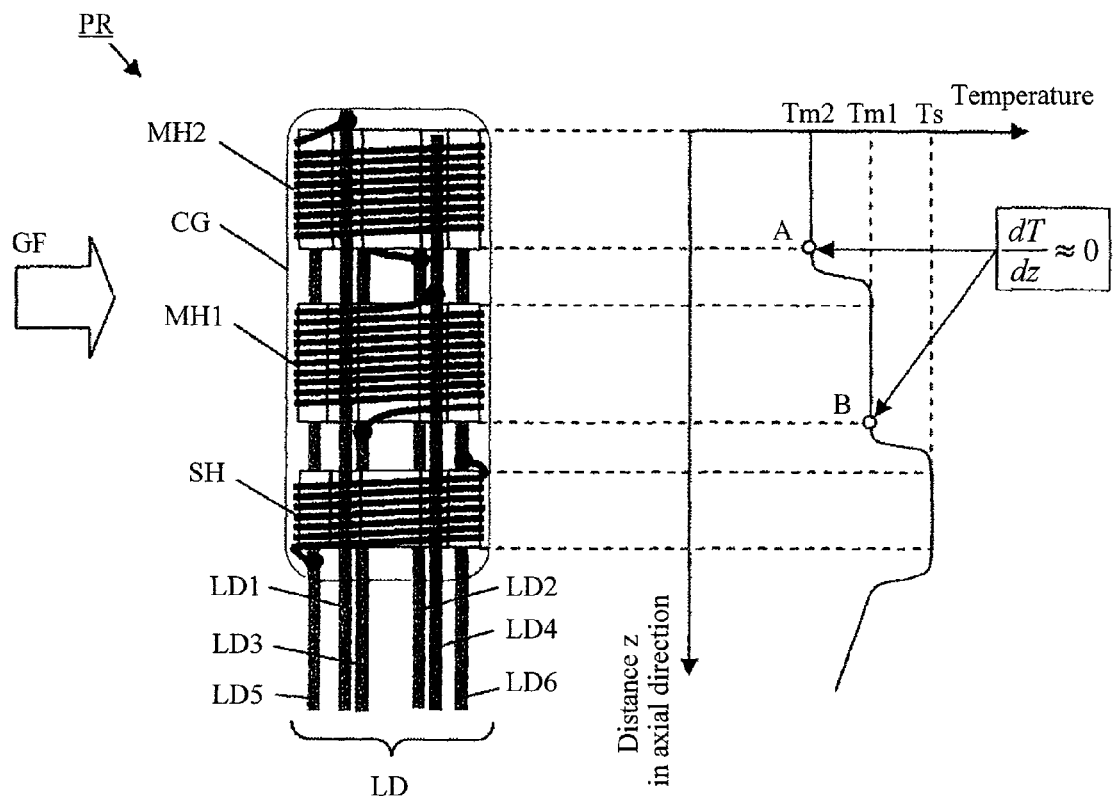
FIG. 16
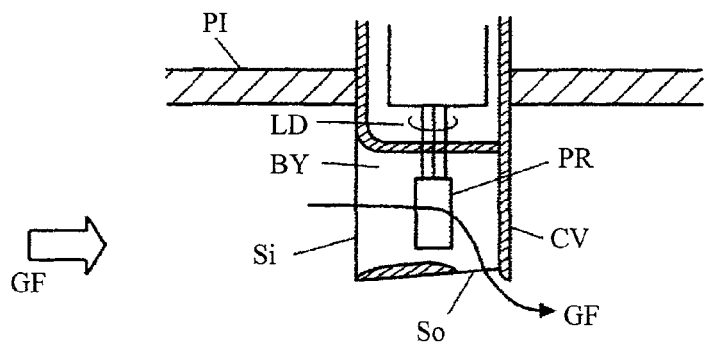

THERMAL TYPE FLOW METER

BACKGROUND OF THE INVENTION

1. Field of the Invention

The present invention relates to a thermal type flow meter for measuring a mass flow rate of a fluid, and in particular relates to a thermal type flow meter suitable for detecting a flow rate of an exhaust gas from an engine.

2. Description of the Related Art

As a thermal type measurement system, firstly, there is known a thermal type flow measuring device in which: two resistors are arranged in a fluid, one of them is used as a temperature measuring resistor for detecting the temperature of the fluid while the other one is used as a heating resistor for detecting the flow rate of the fluid; and the mass flow rate of the fluid is measured by keeping a temperature difference ($\Delta T_h$) between these resistors always constant (for example, see International Patent Publication No. WO 03/016833 (hereinafter called Patent Document 1)).

As the temperature measuring resistor, for example, a platinum wire or the like having a large variation in resistance value depending on the temperature is used. Since there is a certain relationship between the temperature and resistance value of the platinum wire, the temperature of the temperature measuring resistor can be detected by measuring the resistance of the temperature measuring resistor. Furthermore, the temperature of the fluid can be obtained assuming that the temperature of peripheral fluid and the temperature of the temperature measuring resistor are equal.

However, when the fluid temperature abruptly changes, the temperature of the temperature measuring resistor and the fluid temperature become different due to the heat capacity and the like of the temperature measuring resistor. Consequently, the fluid temperature cannot be detected correctly and an error in a flow rate increases.

In contrast, secondly, there is known a flow rate measuring device in which: a temperature measuring resistor is not used but two heating resistors are disposed in a fluid; and a flow rate unrelated to the temperature of the fluid is detected from a relationship between amounts of heat supplied from the respective heating resistors to the fluid (for example, see Japanese Patent Application Publication No. Sho 59-136620 (hereinafter called Patent Document 2)).

According to this method, a temperature measuring resistor is not used and therefore accurate flow rate measurement is possible even if the fluid temperature abruptly changes.

SUMMARY OF THE INVENTION

However, in the flow measuring device described in Patent Document 2, a fluid flow rate $Q_g$ is inversely proportional to the square of a temperature difference of the two heating resistors ($T_{h1}$-$T_{h2}$). Therefore, an error occurs in the obtained flow rate when the temperature difference of the two heating resistors ($T_{h1}$-$T_{h2}$) is small.

Usually, in the thermal type flow meter, in order to perform sufficient heat radiation from a heating resistor to peripheral gas, the temperature of the heating resistor is preferably set higher by around 200° C. than the fluid temperature. For this reason, for example, when the flow rate of a high-temperature fluid, such as the flow rate of an exhaust gas from an engine, is measured, the lowest setting temperature of the heating resistor is set higher. On the other hand, the highest temperature of the heating resistor usually needs to be lower than the heat-resistant temperature of a cover glass with which the surface of the heating resistor is coated. Although the heat-resistant temperature of the cover glass varies with glass compositions, it is around 700° C., for example.

Accordingly, when the lowest setting temperature of the heating resistor is high as in the case of measuring the flow rate of a high-temperature fluid, such as the flow rate of an exhaust gas from an engine, the temperature difference of the two heating resistors ($T_{h1}$-$T_{h2}$) is small and thus an error is likely to occur in the obtained flow rate.

It is an object of the present invention to provide a thermal type flow meter capable of accurately detecting a flow rate even when a fluid temperature varies rapidly or when a fluid temperature is high.

(1) To achieve the above object, an aspect of the present invention provides a thermal type flow meter including: a first main heating resistor; a second main heating resistor set at a temperature different from that of the first main heating resistor; a sub-heating resistor for heating lead wires of the two main heating resistors; a temperature calculating means for finding a temperature of a fluid by using the two main heating resistors; and a flow rate calculating means for finding a flow rate of the fluid by using at least one of the two main heating resistors.

With such a structure, the flow rate can be accurately detected even when the fluid temperature varies rapidly or when the fluid temperature is high.

(2) In the above-described aspect (1), the flow rate calculating means preferably finds the fluid flow rate by using the fluid temperature found by the temperature calculating means and at least one of the temperatures of the two main heating resistors.

(3) In the above-described aspect (2), the flow rate calculating means preferably finds the fluid flow rate by using the temperature of the main heating resistor having a higher setting temperature.

(4) In the above-described aspect (1), it is preferable that, of the two main heating resistors, the main heating resistor having a lower setting temperature be set at a temperature that is higher than a fluid temperature by at least a predetermined temperature, and that the main heating resistor having a higher setting temperature be set at a temperature which is lower than a predetermined upper limit temperature.

(5) In the above-described aspect (1), it is preferable that the sub-heating resistor include: a first sub-heating resistor for heating the support member of the first main heating resistor; and a second sub-heating resistor for heating the support member of the second main heating resistor, and that a temperature of the first sub-heating resistor be set higher than a temperature of the first main heating resistor while a temperature of the second sub-heating resistor be set higher than a temperature of the second main heating resistor.

(6) In the above-described aspect (5), it is preferable that a first probe having the first main heating resistor and the first sub-heating resistor and supported at one side thereof and a second probe having the second main heating resistor and the second sub-heating resistor and supported at one side thereof be arranged in parallel with respect to a flow of the fluid, and that the first and second probes be inserted into the fluid from one side of a fluid passage.

(7) In the above-described aspect (6), the thermal type flow meter preferably further includes a shield plate arranged in the flow direction between the two first and second probes.

(8) In the above-described aspect (7), it is preferable that the shield plate be thin on an upstream side of the flow and be thick in a vicinity of the probes.

(9) In the above-described aspect (1), it is preferable that a probe including the first and second main heating resistors and one sub-heating resistor be supported by lead wires, that the support members be connected to a sensor control unit, that the sub-heating resistor, the first main heating resistor, and the second main heating resistor be arranged in this order when viewed from the sensor control unit side, and that a relationship of (a setting temperature of the sub-heating resistor)>(a setting temperature of the first main heating resistor)>(a setting temperature of the second main heating resistor) be established among the setting temperatures of these heating resistors.

(10) In the above-described aspect (9), it is preferable that the first and second main heating resistors share positive and negative electrodes, and that an electrical resistance value of the second main heating resistor be larger than an electrical resistance value of the first main heating resistor.

(11) In the above-described aspect (9), it is preferable that the first main heating resistor and the second main heating resistor of the probe be arranged in parallel with respect to a flow of the fluid, and that the probe be inserted into the fluid from one side of a fluid passage.

According to the present invention, a flow rate can be accurately detected even when a fluid temperature varies rapidly or when a fluid temperature is high.

BRIEF DESCRIPTION OF THE DRAWINGS

FIG. 15A is a plan view showing a structure of a probe for flow rate measurement used in a thermal type flow meter according to a second embodiment of the present invention; FIG. 15B shows a temperature distribution of the probe.

FIG. 16 is a side view of a partial cross section showing a state in which the thermal type flow meter according to the second embodiment of the present invention is mounted on an exhaust pipe of an engine.

DESCRIPTION OF THE PREFERRED EMBODIMENTS

Hereinafter, a structure and an operation of a thermal type flow meter according to a first embodiment of the present invention will be described using FIG. 1 to FIG. 12.

First, an overall structure of the thermal type flow meter according to this embodiment will be described using FIG. 1 and FIG. 2.

Figure 1:
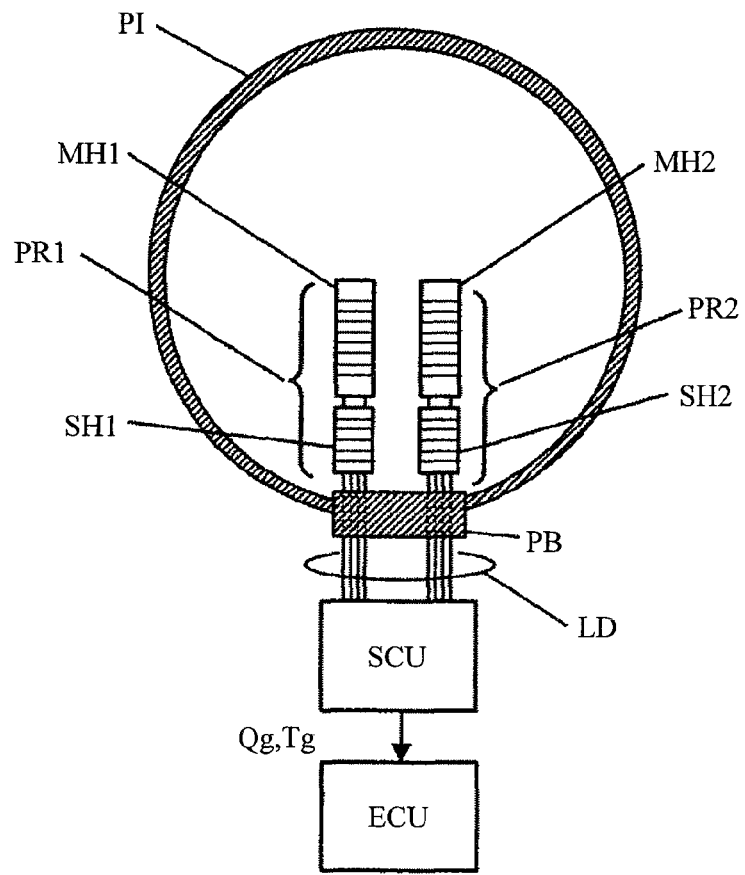
FIG. 1 is a front view of a partial cross section illustrating an overall structure of a thermal type flow meter according to a first embodiment of the present invention.

FIG. 1 is a front view of a partial cross section illustrating the overall structure of the thermal type flow meter according to the first embodiment of the present invention. FIG. 2 is a plan view of a partial cross section illustrating the overall structure of the thermal type flow meter according to the first embodiment of the present invention.

Figure 2:
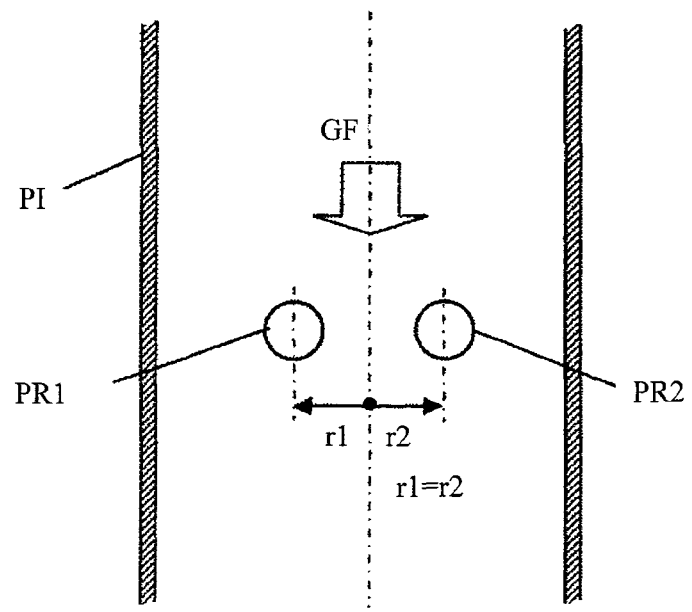
FIG. 2 is a plan view of a partial cross section illustrating the overall structure of the thermal type flow meter according to the first embodiment of the present invention.

FIG. 1 and FIG. 2 show a structure example when the thermal type flow meter according to this embodiment is used for flow rate measurement of exhaust gas from an engine.

In FIG. 1, probes PR1, PR2 for flow rate measurement are inserted in an exhaust passage PI of an engine. The probes PR1, PR2 are electrically connected to a sensor control unit SCU installed outside the exhaust passage PI by lead wires LD. A probe base PB is inserted in an opening provided in the exhaust passage PI, and the lead wires penetrate the probe base PB, thereby fixing the probes PR1, PR2 to an interior of the exhaust passage PI. The probe base PB is made of a material such as alumina having a high heat resistance and electric insulation.

The probe PR1 includes a main heating resistor MH1 and a sub-heating resistor SH1. The probe PR2 includes a main heating resistor MH2 and a sub-heating resistor SH2.

The sensor control unit SCU supplies power to the probes PR1, PR2, and calculates a fluid temperature $T_g$ and a flow rate $Q_g$ from the outputs of the probes PR1, PR2 to send the results to an engine control unit ECU.

FIG. 2 is a plan view of FIG. 1 when viewed from the above, and indicates a positional relationship between a direction GF of a gas flow and the two probes PR1, PR2. The two probes PR1, PR2 are preferably arranged bilaterally symmetric about the central axis of the exhaust passage PI. An interval (r1+r2) between the two probes PR1, PR2 is also preferably narrowed as much as possible in such a range that the probes PR1, PR2 may be subject to neither the influence of heat relative to each other nor the influence of disturbance of the gas. This is to make the gas flow rate and the gas temperature on the surface of the probe PR1 be the same as those of the probe PR2. The interval (r1+r2) needs to be changed according to the flow rate of an exhaust gas, i.e., the displacement of an engine. Here, it is in the range from 2 to 10 mm, for example.

The thermal type flow meter is structured in such a way that, as shown in FIG. 2, the two probes PR1, PR2 are arranged in parallel inside the exhaust passage PI and in a plane orthogonal to a direction in which exhaust gas flows, and that, as shown in FIG. 1, the probes PR1, PR2 are supported at one ends thereof. By employing such a structure, the lead wires LD can be compactly put together even if multiple probes are used, and the probes can be easily attached to an opening only provided in one part of the exhaust passage PI.

Next, the structure of the probes PR1, PR2 for flow rate measurement used in the thermal type flow meter according to this embodiment will be described using FIGS. 3A, 3B and FIGS. 4A, 4B.

Figures 3A, 3B:
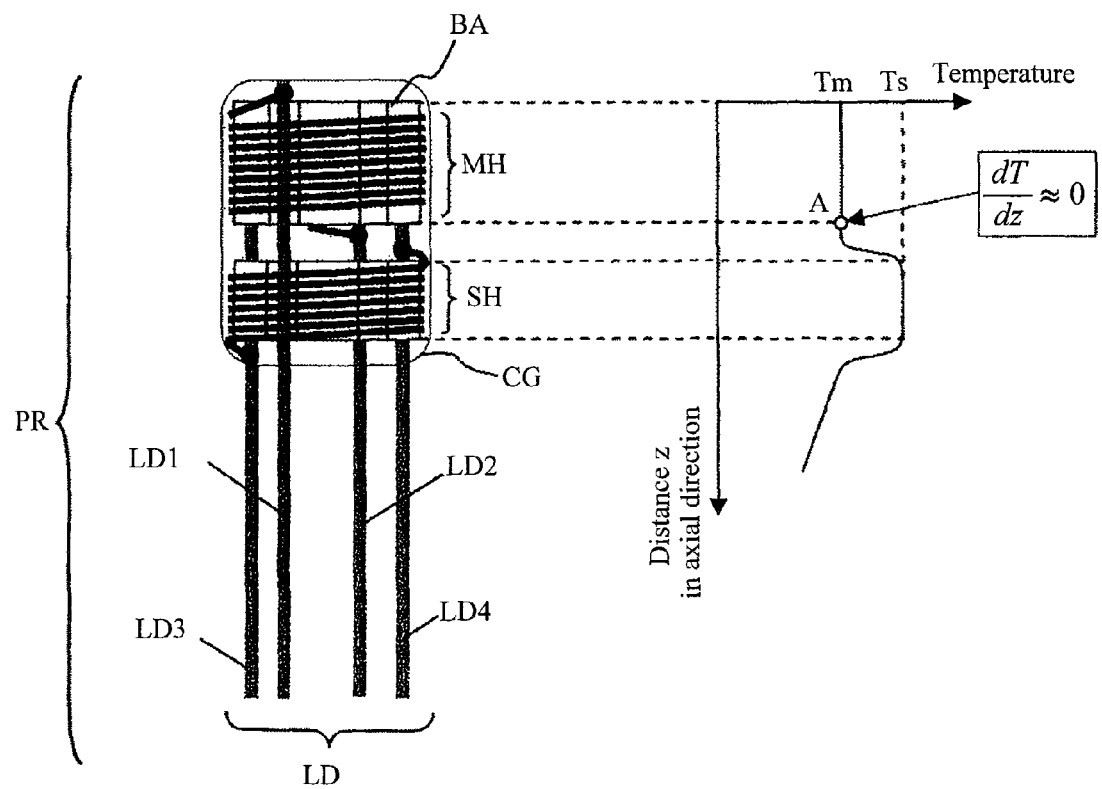
FIG. 3A is a plan view showing a structure of a probe for flow rate measurement used in the thermal type flow meter according to the first embodiment of the present invention.
FIG. 3B shows a temperature distribution of the probe.
Figure 4A:
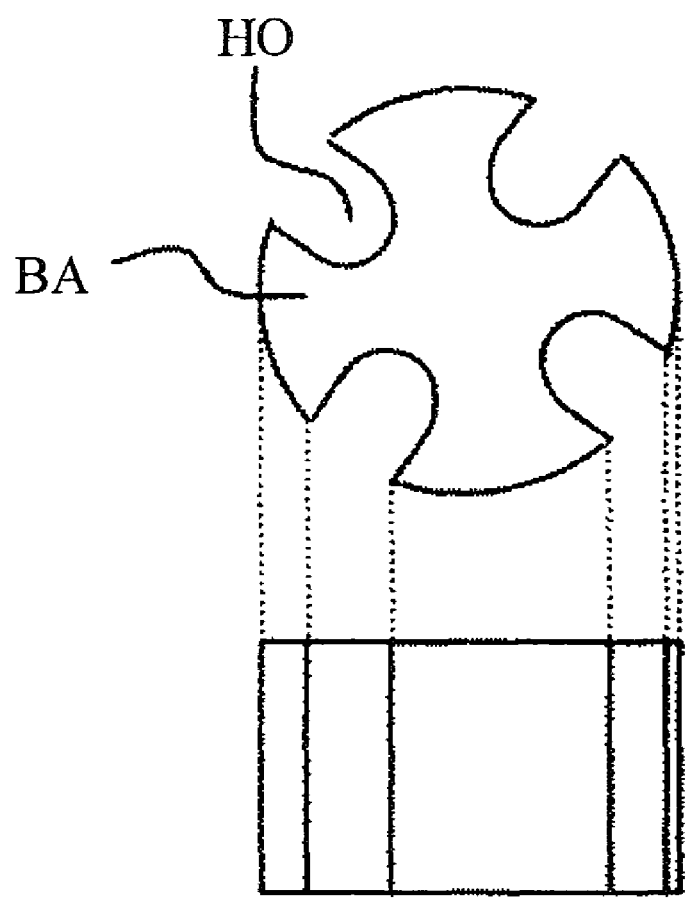
FIGS. 4A, 4B are a front view and a plan view, respectively, showing a structure of a supporting substrate of the probe for flow rate measurement used in the thermal type flow meter according to the first embodiment of the present invention.
Figure 4B:

FIG. 3A is a plan view showing the structure of the probe for flow rate measurement used in the thermal type flow meter according to the first embodiment of the present invention. FIGS. 4A, 4B are a front view and a plan view, respectively, illustrating the structure of a supporting substrate of the probe for flow rate measurement used in the thermal type flow meter according to the first embodiment of the present invention.

FIG. 3A shows a planar shape of the probe, and FIG. 3B shows a temperature distribution of the probe. Since the probe PR1 and the probe PR2 shown in FIG. 1 have the same structure, these probes are described as a probe PR, here.

As shown in FIG. 3A, the probe PR includes a main heating resistor MH, a sub-heating resistor SH, lead wires LD1 to LD4, and a coating glass CG for coating the surfaces of the main heating resistor MH and the sub-heating resistor SH. The main heating resistor MH and the sub-heating resistor SH each have a structure in which a platinum wire is wound around a supporting substrate BA more than once.

As shown in FIGS. 4A and 4B, the supporting substrate BA has semicircular grooves HO provided at every 90 degrees in a circumferential direction. The width of each groove HO is slightly larger than the diameter of each lead wire LD. The supporting substrate BA is made of a material such as alumina having a high heat resistance and electric insulation.

The lead wire LD is inserted in the groove HO of the supporting substrate BA, over which the platinum wire is wound. The both ends of the platinum wire are welded to the lead wire LD, the outside of which is hardened by the coating glass CG, thereby fixing the platinum wire and the lead wire LD. The lead wire LD is made of a material such as a platiniridium alloy having high electrical conductivity.

In the structure of the probe of FIG. 3A, by applying a voltage between the lead wire LD1 and the lead wire LD2, current flows through the main heating resistor MH, so that heat is generated. Likewise, by applying a voltage between the lead wire LD3 and the lead wire LD4, current flows through the sub-heating resistor SH, so that heat is generated. The current is controlled by the sensor control unit SCU shown in FIG. 1. The detail structure of the sensor control unit SCU will be described later using FIG. 5.

FIG. 3B shows the temperature distribution in an axial direction of the probe PR. A temperature $T_s$ of the sub-heating resistor SH is set at a temperature slightly high as compared with a temperature $T_m$ of the main heating resistor MH. This is to prevent a heat from being transported from the lead wire LD to the main heating resistor MH due to heat conduction between the main heating resistor MH and the lead wire LD. The amount of heat to be transported due to the heat conduction is proportional to a temperature gradient dT/dz. By setting the temperature $T_s$ of the sub-heating resistor SH slightly higher than the temperature $T_m$ of the main heating resistor MH, the temperature gradient at a boundary (point "A") between the main heating resistor MH and the lead wire LD becomes approximately zero, thereby eliminating the heat flow between the main heating resistor MH and the lead wire LD. Although the optimum value of a temperature difference $\Delta T_s$ between the temperature $T_s$ of the sub-heating resistor SH and the temperature $T_m$ of the main heating resistor MH is determined by the setting temperature of the heating resistor, the gas temperature, the distance between the main heating resistor MH and the sub-heating resistor SH, and the like, it is in the range around 10 to 50° C., for example, when the temperature of the heating resistor is 600° C.

Note that, when the temperature $T_s$ of the sub-heating resistor SH and the temperature $T_m$ of the main heating resistor MH are the same, the temperature of the lead wire LD between the main heating resistor MH and the sub-heating resistor SH decreases due to heat radiation to the peripheral gas. As a result, the temperature gradient at the point "A" does not become zero and thus a heat flow from the main heating resistor MH to the lead wire LD occurs.

Although the details will be described later, the detection accuracy of the gas temperature and gas flow rate can be improved in this embodiment, by eliminating the heat flow between the main heating resistor and the lead wire.

Next, the structure and operation of the sensor control unit SCU of the thermal type flow meter according to the first embodiment of the present invention will be described using FIG. 5 to FIG. 10.

First, the structure of the sensor control unit SCU of the thermal type flow meter according to this embodiment will be described using FIG. 5.

Figure 5:
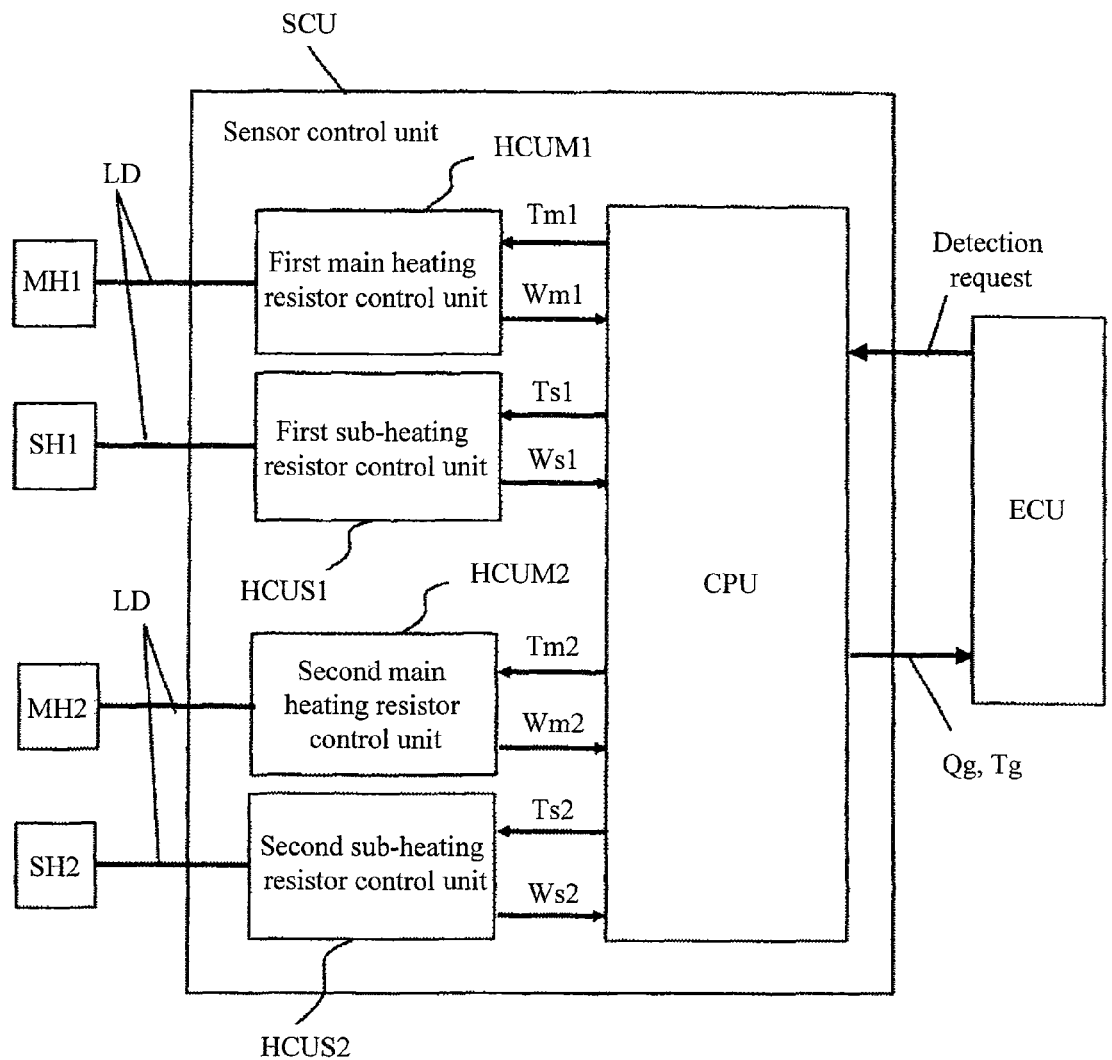
FIG. 5 is a block diagram showing a structure of a sensor control unit of the thermal type flow meter according to the first embodiment of the present invention.

FIG. 5 is a block diagram showing the structure of the sensor control unit of the thermal type flow meter according to the first embodiment of the present invention. Note that, the same reference numeral as that of FIG. 1 denotes the same portion.

The sensor control unit SCU includes a microcomputer CPU, two sets of main heating resistor control units HCUM1, HCUM2 and two sets of sub-heating resistor control units HCUS1, HCUS2.

The microcomputer CPU outputs desired temperature setting values $T_{m1}$, $T_{m2}$ to the main heating resistor control units HCUM1, HCUM2, respectively. The main heating resistor control units HCUM1, HCUM2 output power supply values $W_{m1}$, $W_{m2}$ for the respective main heating resistors MH1, MH2 to the microcomputer CPU. Moreover, the microcomputer CPU outputs desired temperature setting values $T_{s1}$, $T_{s2}$ to the sub-heating resistor control units HCUS1, HCUS2, respectively. The sub-heating resistor control units HCUS1, HCUS2 output power supply values $W_{s1}$, $W_{s2}$ for the respective sub-heating resistors SH1, SH2 to the microcomputer CPU. The microcomputer CPU receives a detection request from the ECU, and outputs a detected flow rate $Q_g$ and a gas temperature $T_g$ to the ECU.

Here, assuming that the maximum temperature of the exhaust gas is 400° C., the heat-resistant temperature of the coating glass CG (cover glass) described in FIG. 3 is 700° C., for example, then the desired temperature setting value $T_{m2}$ of the second main heating resistor MH2 is 600° C., for example, and the desired temperature setting value Tm1 of the first main heating resistor MH1 is 650° C., for example. Moreover, the desired temperature setting value $T_{s2}$ of the second sub-heating resistor SH2 is 630° C., for example, and the desired temperature setting value $T_{s1}$ of the first sub-heating resistor SH1 is 680° C., for example.

Next, a structure of the heating resistor control unit HCU used in the sensor control unit SCU of the thermal type flow meter according to this embodiment will be described using FIG. 6.

Figure 6:
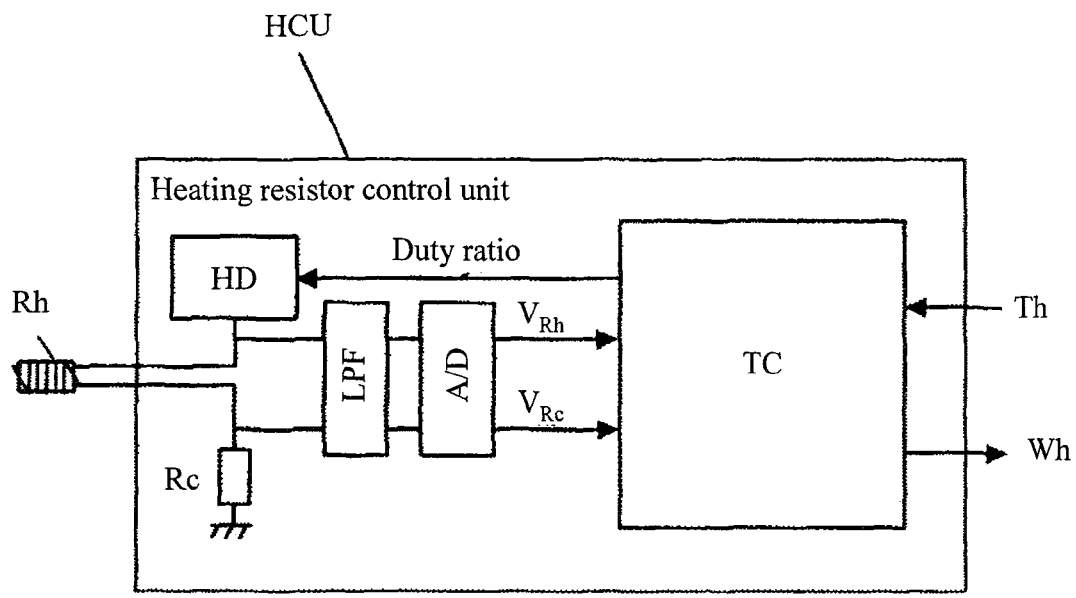
FIG. 6 is a block diagram showing a structure of a heating resistor control unit used in the sensor control unit of the thermal type flow meter according to the first embodiment of the present invention.

FIG. 6 is a block diagram showing the structure of the heating resistor control unit HCU used in the sensor control unit SCU of the thermal type flow meter according to the first embodiment of the present invention. Note that the same reference numeral as that of FIG. 1 or FIG. 5 denotes the same portion.

Since all of the structures of the main heating resistor control units HCUM1, HCUM2 and the sub-heating resistor control units HCUS1, HCUS2 shown in FIG. 5 are the same, these are described as the heating resistor control unit HCU, here. Moreover, the main heating resistor MH1, the sub-heating resistor SH1, the main heating resistor MH2, and the sub-heating resistor SH2 shown in FIG. 1 are described as a heating resistor Rh, here.

The heating resistor control unit HCU includes a temperature control unit TC, a heater driving unit HD, a low-pass filter LPF, an analog-to-digital converter A/D, and a fixed resistor Rc.

The heater driving unit HD applies a voltage to the heating resistor Rh. The heater driving unit HD varies the voltage value to be applied to the heating resistor Rh according to instructions from the temperature control unit TC.

The heating resistor Rh and the fixed resistor Rc are connected in series. Each of an analog voltage value $V_{Rh}$ between the heater driving unit HD and the heating resistor Rh and an analog voltage value $V_{RC}$ between the heating resistor Rh and the fixed resistor Rc passes through the low-pass filter LP and is then inputted to the analog-to-digital converter A/D. Then, the voltage value $V_{Rh}$ and the voltage value $V_{RC}$ converted into digital values by the analog-to-digital converter A/D are each inputted to the temperature control unit TC.

Next, an operation of the heater driving unit HD of the thermal type flow meter according to this embodiment will be described using FIG. 7 and FIG. 8.

Figure 7:
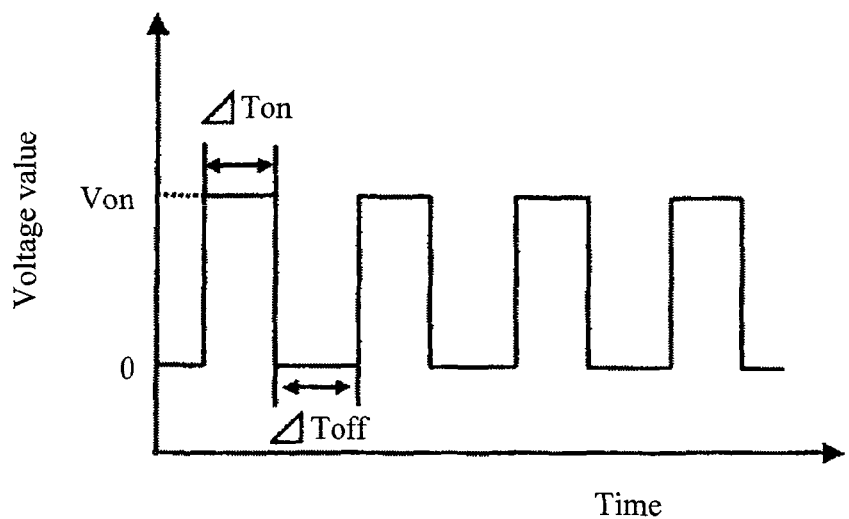
FIG. 7 is a graph for explaining the operation of a heater driving unit of the thermal type flow meter according to the first embodiment of the present invention.
Figure 8:
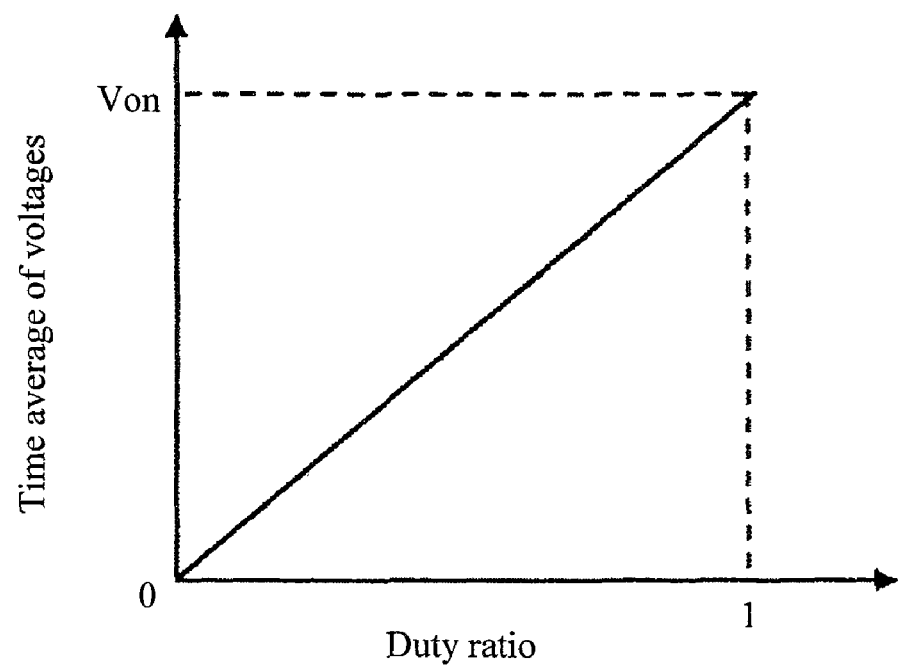
FIG. 8 is a graph for explaining the operation of the heater driving unit of the thermal type flow meter according to the first embodiment of the present invention.

FIG. 7 and FIG. 8 are graphs for explaining the operation of the heater driving unit of the thermal type flow meter according to the first embodiment of the present invention.

FIG. 7 shows an example of the waveform of a voltage applied from the heater driving unit HD to the heating resistor $R_h$. The waveform of the voltage outputted from the heater driving unit HD to the heating resistor Rh is a square wave as shown in FIG. 7, and the voltage takes binary values of zero and $V_{on}$. Here, in one square wave, a period in which the voltage is zero is represented by $\Delta T_{off}$ and a period in which the voltage is $V_{on}$ is represented by $\Delta T_{on}$. Moreover, (the period $\Delta T_{off}$+the period $\Delta T_{on}$) is assumed to always have a constant value. Namely, the frequency of the rectangular pulse is assumed to be always constant. Here, the duty ratio is given by Formula (1) below.

Formula 1

$$\text{Duty ratio} = \frac{\Delta T_{ON}}{\Delta T_{ON} + \Delta T_{OFF}} \quad (1)$$

Namely, the duty ratio represents the proportion of the time of $V_{on}$ per pulse cycle (the period $\Delta T_{off}$+the period $\Delta T_{on}$). The duty ratio can be set to any value in the range from 0 to 1 according to an instruction from the temperature control unit TC.

FIG. 8 shows an example of the relationship between the duty ratio and time average of heater supply voltages applied from the heater driving unit HD to the heating resistor Rh. Here, the time average of voltages denotes an average of voltages of 100 square pulses, for example, or an average of voltages applied during one second, for example. The interval over which the time average is taken is suitably determined from various factors or required specifications, such as a response speed required for the flow meter, a time constant of the circuit, and the operation frequency of the microcomputer.

As shown in FIG. 8, the average voltage is in proportion to the duty ratio. In other words, the temperature control unit TC can vary the time average of voltages applied to the heating resistor Rh in the range from 0 to Von as desired by suitably varying the duty ratio, which is instructed to the heater driving unit, in the range from 0 to 1.

Figure 9:
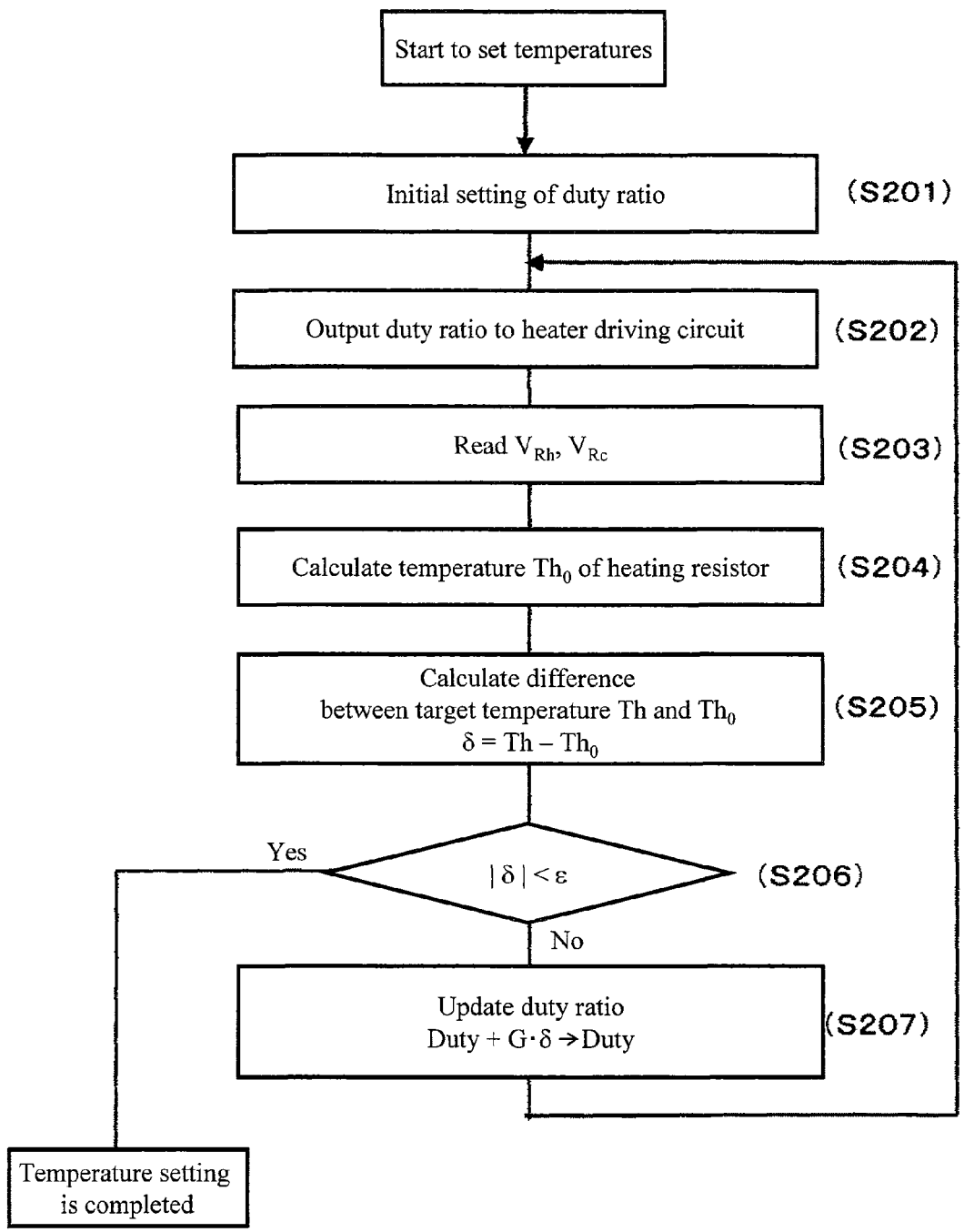
FIG. 9 is a flowchart showing the content of a method of setting a temperature of a heating resistor in the heating resistor control unit of the thermal type flow meter according to the first embodiment of the present invention.

Next, a method of setting the temperature of the heating resistor in the heating resistor control unit HCU of the thermal type flow meter according to this embodiment will be described using FIG. 9. FIG. 9 is a flowchart showing the content of the method of setting the temperature of the heating resistor in the heating resistor control unit HCU of the thermal type flow meter according to the first embodiment of the present invention.

In Step S201, the heating resistor control unit HCU determines an initial value of the duty ratio to be outputted to the heater driving unit HD, and outputs this duty ratio to the heater driving unit HD in Step S202. The heater driving unit HD applies a voltage based on the inputted duty ratio to the heating resistor Rh, as shown in FIG. 8.

Next, in Step S203, a time average $V_{Rh}$ of voltages applied from the heater driving unit HD to the heating resistor Rh and a voltage value $V_{RC}$ across the fixed resistor Rc are read into the temperature control unit TC by the heating resistor control unit HCU, and calculates a current temperature $T_{h0}$ of the heating resistor Rh in Step S204.

Between a resistance value $R_h$ and a temperature $T_h$ of the heating resistor Rh, there is a certain correlation as shown in Formula (2) below:

Formula 2

$$R_h = R_0 + \alpha(T_h - T_o) \quad (2)$$

Therefore, if the resistance value $R_h$ of the heating resistor is known, the temperature $T_h$ of the heating resistor can be found. Note that, in Formula (2), α denotes a temperature coefficient of resistance, $T_0$ denotes a reference temperature, and $R_0$ denotes a resistance value at a reference temperature.

The resistance value $R_h$ of the heating resistor can be calculated using the voltage value $V_{Rh}$ and the voltage value $V_{RC}$ according to Formula (3) below derived from Ohm's Law:

Formula 3

$$R_h = \frac{(V_{Rh} - V_{RC})R_c}{V_{Rh}}. \tag{3}$$

Next, in Step S205, the heating resistor control unit HCU finds a difference $\delta$ between a set target temperature $T_h$ and the current temperature $T_{h0}$ of the heating resistor, and then compares the absolute value of the difference $\delta$ with a predetermined threshold value $\epsilon$ (a fine value for a convergence test) in Step S206. If the absolute value of the difference $\delta$ is larger than the threshold value $\epsilon$, the current duty ratio is updated with Duty=Duty+G·$\delta$ by proportional control (P control) in Step S207 (where G is a predetermined gain of the proportional control).

After the duty ratio is updated, the flow returns to Step S202, and hereafter, Step S202 to Step S207 will be repeated until the temperature of the heating resistor Rh converges to the setting temperature $T_h$.

Note that, in this embodiment, the proportional control (P control) is used for the update of the duty ratio in Step S207; however, by using proportional plus integral control (PI control), proportional plus integral plus derivative control (PID control), or the like, the temperature of the heating resistor Rh can be accurately converged to the setting temperature in a short time.

In Step S206, if it is determined that the absolute value of the difference $\delta$ is smaller than the threshold value $\epsilon$, then the temperature of the heating resistor Rh can be regarded as having converged to the setting temperature $T_h$, and the temperature setting of the heating resistor is completed.

Note that, these processes are common with the main heating resistor MH1, the main heating resistor MH2, the sub-heating resistor SH1, and the sub-heating resistor SH2.

Figure 10:
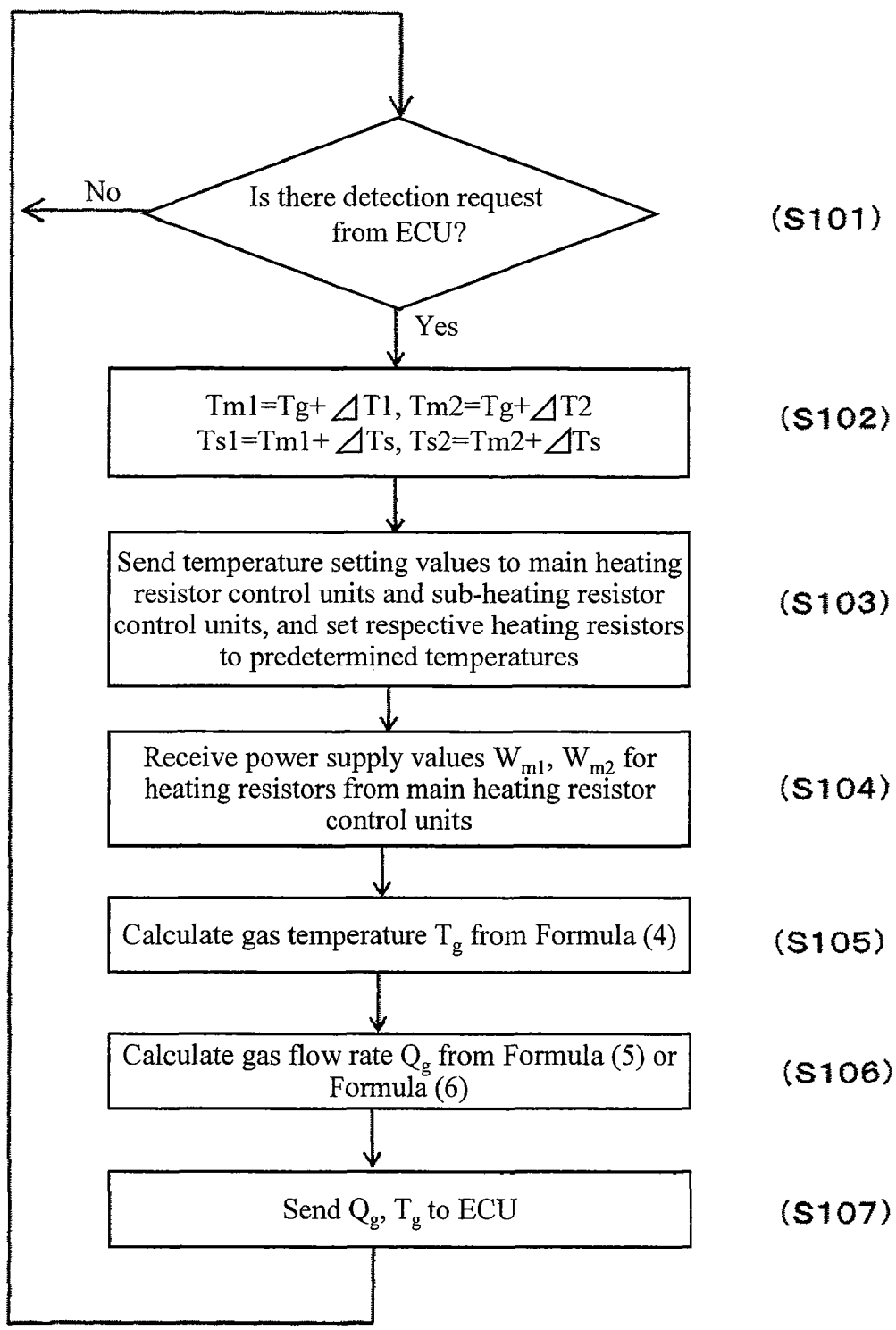
FIG. 10 is a flowchart showing the content of a method of calculating a gas temperature and a gas flow rate in the sensor control unit of the thermal type flow meter according to the first embodiment of the present invention.

Next, a method of calculating the gas temperature and the gas flow rate in the sensor control unit SCU of the thermal type flow meter according to this embodiment will be described using FIG. 10. FIG. 10 is a flowchart showing the content of the method of calculating the gas temperature and the gas flow rate in the sensor control unit of the thermal type flow meter according to the first embodiment of the present invention.

First, in Step S101, the sensor control unit SCU waits for a request to detect a gas temperature $T_g$ and a gas flow rate $Q_g$ from the engine control unit ECU. If there is the request, then in Step S102, the sensor control unit SCU finds a temperature setting value $T_{m1}$ of the main heating resistor MH1, a temperature setting value $T_{m2}$ of the main heating resistor MH2, a temperature setting value $T_{s1}$ of the sub-heating resistor SH1, and a temperature setting value $T_{s2}$ of the sub-heating resistor SH2 as $T_{m1}=T_g+\Delta T_1$, $T_{m2}=T_g+\Delta T_2$, $T_{s1}=T_{m1}+\Delta T_s$, and $T_{s2}=T_{m2}+\Delta T_s$, respectively, where $\Delta T_1$, $\Delta T_2$, and $\Delta T_s$ are predetermined temperature differences, and a relationship between $\Delta T_1$ and $\Delta T_2$ meets $\Delta T_1 > \Delta T_2$. In order to perform sufficient heat radiation from the main heating resistor to the gas, the temperature of the main heating resistor is preferably set higher by at least around 200° C. than the gas temperature. On the other hand, the temperature of the main heating resistor needs to be lower than the heat-resistant temperature of a material constituting the probe. As described above, the probe is typically made of platinum, alumina, glass, or the like. Among these materials, the melting point of glass is the lowest and is around 700° C. Accordingly, $\Delta T_1$, $\Delta T_2$, and $T_{s1}$ are predetermined in accordance with the gas temperature to be measured in such a range that $\Delta T_2$ may be around 200° C., $\Delta T_1$ may be larger than $\Delta T_2$, and $T_{s1}$ may be lower than the glass melting point. Accordingly, when the temperature of a fluid, such as an exhaust gas from an engine, to be measured is high, the temperature difference between the main heating resistor MH1 and the main heating resistor MH2 is small.

Moreover, for the gas temperature $T_g$ needed in Step S102, the gas temperature $T_g$ found when there was a request from the ECU one step earlier is used. The gas temperature $T_g$ in Step S102 is used to determine the setting temperature of the heating resistor, so even if there is a deviation from the current gas temperature, this deviation hardly affects the accuracy of the gas temperature and gas flow rate to be calculated.

Next, in Step S103, the sensor control unit SCU sends the temperature setting values found in step S102 to the main heating resistor control units HCUM1, HCUM2 and the sub-heating resistor control units HCUS1, HCUS2. Thereby, the temperatures of the two sets of main heating resistors MH1, MH2 and the two sets of sub-heating resistors SH1, SH2 are set to predetermined temperatures by the respective heating resistor control units HCU.

Next, in Step S104, the sensor control unit SCU receives power supply values $W_{m1}$, $W_{m2}$ for the heating resistors MH1, MH2 from the two main heating resistor control units HCUM1, HCUM2.

Then, in Step S105, the sensor control unit SCU finds a current gas temperature $T_g$ using Formula (4) below.

Formula 4

$$T_g = \frac{\left(\frac{C_2}{C_1}\right)\left(\frac{W_{m1}}{W_{m2}}\right)T_{m2} - T_{m1}}{\left(\frac{C_2}{C_1}\right)\left(\frac{W_{m1}}{W_{m2}}\right) - 1} \tag{4}$$

Next, in Step S106, the sensor control unit SCU finds a gas flow rate $Q_g$ from Formula (5) or Formula (6) below using the gas temperature $T_g$ obtained in Step S105.

Formula 5

$$Q_g = \frac{W_{m1}^2}{C_1^2(T_{m1} - T_g)^2} \tag{5}$$

Formula 6

$$Q_g = \frac{W_{m2}^2}{C_2^2(T_{m2} - T_g)^2} \tag{6}$$

Next, in Step 107, the sensor control unit SCU sends the gas temperature $T_g$ and gas flow rate $Q_g$ found in the above processes to the ECU, and then returns to Step 101 to wait for the next detection request.

Next, the principle to calculate the gas temperature and gas flow rate will be described.

Among the power supply value $W_{m1}$ for the first main heating resistor MH1, the gas mass flow rate $Q_g$, the temperature $T_{m1}$ of the heating resistor, and the gas temperature $T_g$, an energy balance formula of Formula (7) below is established.

Formula 7

$$W_{m1} = C_1 Q_g^{1/2}(T_{m1} - T_g) \tag{7}$$

Similarly, among the power supply value $W_{m2}$ for the second main heating resistor MH2, the gas mass flow rate $Q_g$, the temperature $T_{m2}$ of the main heating resistor, and the gas temperature Tg, an energy balance formula of Formula (8) below is established.

Formula 8

$$W_{m2} = C_2 Q_g^{1/2}(T_{m2} - T_g) \qquad (8)$$

Note that, Formula (7) and Formula (8) indicate that the heat transfer due to a gas stream through the surface of the heating resistor is balanced with the supply power to the heating resistor, and these formulae are established only if there is no heat transfer between the heating resistor and the lead wire.

In the probe in this embodiment, as described in FIG. 1, the main heating resistor and the sub-heating resistor are provided, and the temperature of the sub-heating resistor is set slightly higher than the temperature of the main heating resistor. Since this eliminates the heat transfer between each main heating resistor and the corresponding lead wire, Formula (7) and Formula (8) are established.

Then, if Formula (7) is divided by Formula (8), then Formula (4) for finding the gas temperature $T_g$ is derived. If the gas temperature $T_g$ is found, then a gas mass flow rate $Q_g$ can be found from Formula (5) or Formula (6). Note that C1, C2 in Formulae (4) to (8) are constants.

The CPU of FIG. 5 calculates the gas temperature $T_g$ from Formula (4) using the power supply values $W_{m1}$, $W_{m2}$ obtained from the heating resistor control units HCUM1, HCUM2. Namely, the CPU of FIG. 5 is a temperature calculating means for calculating the fluid temperature using the two main heating resistors. Moreover, the CPU of FIG. 5 calculates the gas mass flow rate $Q_g$ from Formula (5) or Formula (6) using the gas temperature $T_g$ and either one of the temperatures of the two main heating resistors. Namely, the CPU of FIG. 5 is a flow rate calculating means. Since Formula (5) or Formula (6) for calculating the gas mass flow rate $Q_g$ involves a division by the square of a difference between the temperature of the main heating resistor and the gas temperature, the calculation error would be smaller if the flow rate is calculated using the temperature of the heating resistor having a higher setting temperature. Namely, the calculation of the gas flow rate using Formula (5) is more preferable.

When the sub-heating resistor is not provided or when the temperature of the sub-heating resistor is equal to or lower than the temperature of the main heating resistor, a heat transfer between the heating resistor and the lead wire will occur. Therefore, if Formula (7) or Formula (8) is applied to the calculation of the gas temperature and gas flow rate, the detection error will increase. This is because if there is a heat transfer between the heating resistor and the lead wire, a correction term associated with the heat transfer will be required on the right side of each of Formula (7) and Formula (8). In addition, this correction term is a value that varies according to the amount of heat to transfer.

In this embodiment, Formula (5) or Formula (6) for calculating the flow rate is proportional to the square of the power supply value to the heating resistor and is inversely proportional to the square of a difference between the temperature of the heating resistor and the gas temperature $(T_h - T_g)$. In this embodiment, since the temperature of the heating resistor is set at a temperature sufficiently higher than the gas temperature (typically higher by not lower than 200° C.), the denominator of Formula (5) or Formula (6) will not approach 0. In other words, the flow rate calculation according to Formula (5) or Formula (6) is less likely to produce an error even with digital computation performed by a microcomputer or the like. Moreover, Formula (4) for calculating the gas temperature calculates a value within the first order of a ratio of power supply values $W_{m1}/W_{m2}$, and therefore is unlikely to diverge even if $W_{m1}$ and $W_{m2}$ take values close to each other.

Meanwhile, in Patent Document 2, a mass flow rate $(q_m)$ is calculated as $q_m = CA \cdot (U1^2 - U2^2)^2$ described in the upper right column, p. 4 of Patent Document 2. Here, CA is a value found by the temperature of a heating resistor and a resistance value. If the formula for computation of the mass flow rate $(q_m)$ of Patent Document 2 is converted, Formula (9) below can be obtained.

Formula 9

$$q_m = C \frac{(I_{h1}^2 - I_{h2}^2)^2}{(T_{h1} - T_{h2})^2} \qquad (9)$$

To be more specific, in the method of Patent Document 2, since a formula inversely proportional to the square of a temperature difference between two heating resistors is used in Formula (9), a calculation error is likely to occur if the temperature difference between the heating resistors is small.

On the other hand, this embodiment has an advantage in that an error is less likely to occur in the flow rate calculation even if the temperature difference between the heating resistors is small.

Figure 11:
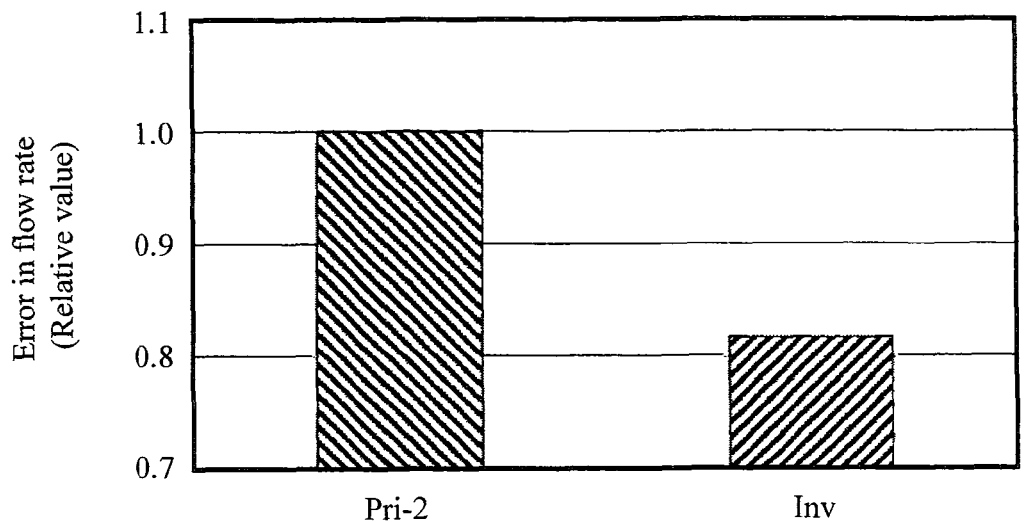
FIG. 11 is a graph for explaining a flow rate calculation error in the thermal type flow meter according to the first embodiment of the present invention.

Next, an error in the flow rate calculation in the thermal type flow meter according to this embodiment will be described using FIG. 11 by comparison with a conventional example. FIG. 11 is a graph for explaining the flow rate calculation error in the thermal type flow meter according to the first embodiment of the present invention.

In FIG. 11, assuming a quantizing error (rounding error) in the case of calculation using a digital computer having a data width of 4 bits, then a flow rate error Pri-2 occurred when data provided by the conventional method shown in Patent Document 1 is calculated using Formula (9) is relatively compared with a flow rate error Inv calculated using Formula (7) and Formula (8) of the method of this embodiment. Here, the error of the conventional method is assumed to 1.

FIG. 11 shows the average error of the flow rates occurred when the temperature $T_{m2}$ of the main heating resistor MH2 is varied from 600° C. to 650° C. by 0.1° C. step under the conditions of the gas temperature $T_g = 300°$ C. and the temperature Tm1 of the main heating resistor MH1=700° C.

The result of FIG. 11 reveals that the method of this embodiment can reduce the error further as compared with the conventional method.

As described above, when the temperature of a fluid is high like the temperature of an exhaust gas from an engine, the temperature setting range of the main heating resistor is narrow and the temperature difference between the two main heating resistors is small because of an upper limit of the temperature of the heating resistor due to the heat-resistant temperature limit and a lower limit of the temperature required as the thermal type flow meter. The thermal type flow meter of this embodiment can accurately calculate the flow rate particularly in a case where such a temperature difference is small. Note that the thermal type flow meter of this embodiment can be used also for the measurement of an intake air amount of an engine.

Next, a temperature detection response in the thermal type flow meter according to this embodiment will be described using FIG. 12 by comparison with a conventional example.

Figure 12:
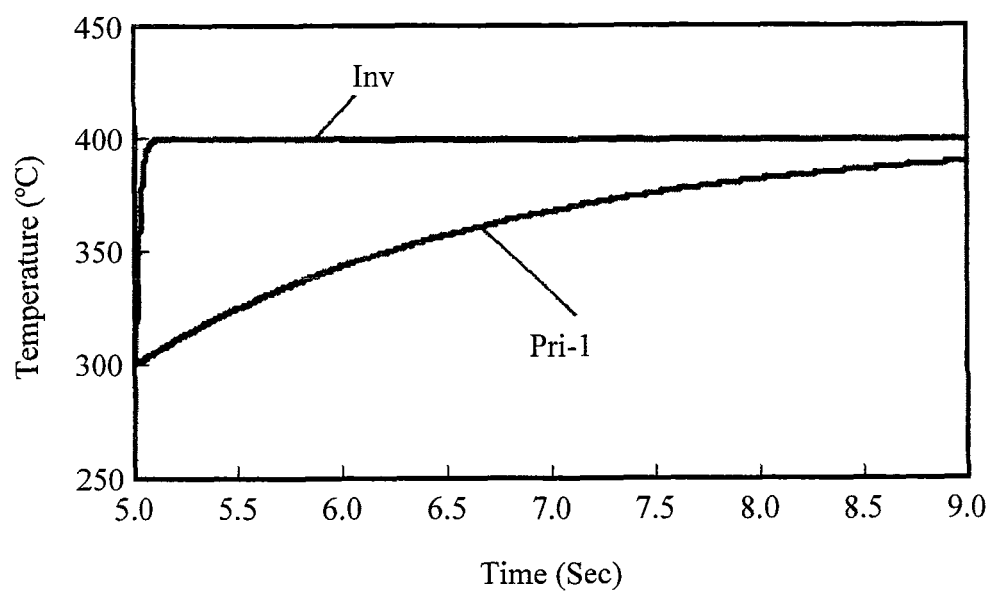
FIG. 12 is a graph for explaining a temperature detection response in the thermal type flow meter according to the first embodiment of the present invention.

FIG. 12 is a graph for explaining the temperature detection response in the thermal type flow meter according to the first embodiment of the present invention.

In this embodiment, the fluid temperature is found using an actively heated heating resistor. Thus, a temperature detection response Inv according to this embodiment is drastically speeded up as compared with a temperature detection response Pri-1 using a temperature measuring resistor method (method described in Patent Document 1) for passively performing temperature detection.

Accordingly, if the thermal type flow meter according to this embodiment is used, it is possible to perform engine control in real-time using the temperature of an exhaust gas or a detected value of the flow rate, for example. For example, the flow meter of the present invention is attached to an exhaust gas recirculation (EGR) passage outside an engine, and the current temperature and the flow rate of an EGR gas are detected. Then, based on these detected values, the fuel injection amount, the fuel injection timing, and the opening degree of an EGR valve or throttle valve are adjusted, thereby making it possible to clean up the exhaust air or improve the fuel consumption.

Next, a state in which the thermal type flow meter according to this embodiment is mounted on an exhaust pipe of an engine will be described using FIG. 13 and FIG. 14.

Figure 13:
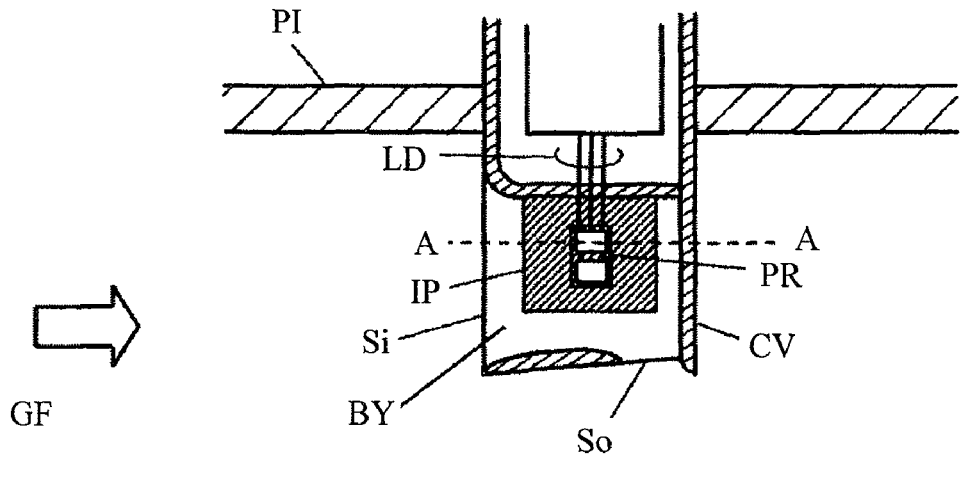
FIG. 13 is a side view of a partial cross section showing a state in which the thermal type flow meter according to the first embodiment of the present invention is mounted on an exhaust pipe of an engine.

FIG. 13 is a side view of a partial cross section showing a state in which the thermal type flow meter according to the first embodiment of the present invention is mounted on an exhaust pipe of an engine. FIG. 14 is a cross sectional view taken along A-A line of FIG. 13. Note that the same reference numeral as that of FIG. 1 or FIG. 3 denotes the same portion.

The probe of the thermal type flow meter according to this embodiment is preferably provided in a sub-passage to prevent an influence from the turbulence of fluid (turbulent flow), the contamination or damage by oil, water, dust, or the like.

FIG. 13 shows a state in which the probe of this embodiment is mounted on an exhaust pipe of an engine by being attached to an interior of the sub-passage. The flow rate sensor according to this embodiment has a structure shown in FIG. 3, and includes two probes PR1, PR2 and a cover CV of the probes. The two probes PR1, PR2 are provided symmetrically about the central cross section of a bypass passage BY, with respect to the gas flow. In the center of the bypass passage BY, a shield plate IP is provided. The shield plate IP has roles to rectify a flow GF in the bypass passage and also to prevent a heat transfer between the probe PR1 and the probe PR2. Specifically, the temperatures of the probe PR1 and probe PR2 are set to high temperature (for example, no less than 500° C.) in detecting the flow rate of a high-temperature fluid. Therefore, if the probe PR1 and the probe PR2 are placed close to each other, a heat transfer might occur between the probe PR1 and the probe PR2 due to the thermal radiation. Moreover, thermal interference will occur because fluid heated by one of the probes flows through the surface of the other one. These thermal effects reduce the detection accuracy of the flow rate and the temperature. To avoid this, the shield plate IP is provided inside the bypass passage BY to block the mutual thermal influence between the probes. Moreover, the shield plate IP can also remove the turbulence in the flow due to the probes.

Figure 14:
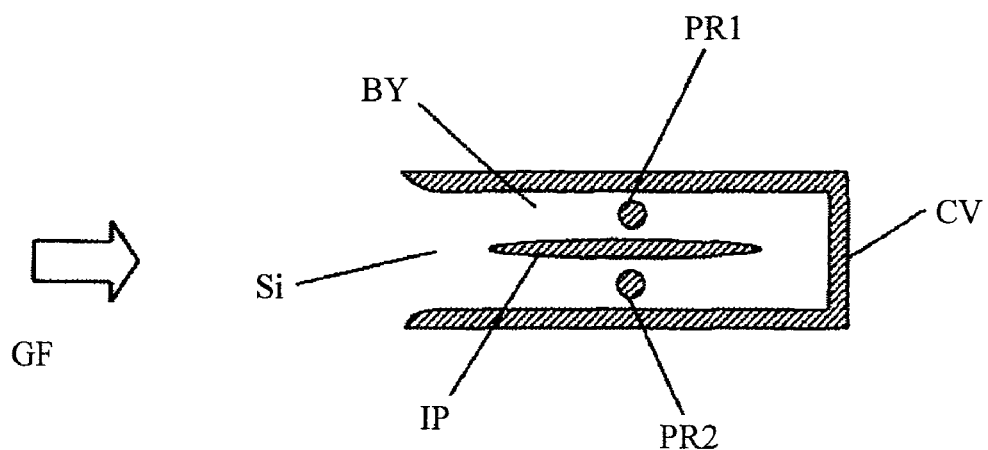
FIG. 14 is a cross sectional view taken along A-A line of FIG. 13.

As shown in FIG. 14, the cross-sectional shape of the shield plate IP is thin at both ends thereof and becomes smoothly thicker as moving toward the center. This can prevent the flow from separating at the edges of the shield plate IP and generating turbulence. This can also reduce the sectional area of the passage in portions where the probes are installed to accelerate the flow, thereby improving the S/N ratio and also suppressing the occurrence of a turbulent flow.

As described above, according to this embodiment, the fluid temperature is calculated using two heating resistors set to different temperatures, and then the fluid flow rate is found using the fluid temperature. Thereby, it is not necessary to acquire a difference between the temperatures of the two heating resistors in calculating the fluid temperature and the fluid flow rate. As a result, an error in the detected flow rate can be reduced even when the setting temperatures of the two heating resistors are close to each other.

Moreover, since there is no need to obtain the fluid temperature using a temperature measuring resistor that is not heated by energization, it is possible to reduce the response delay in detecting the temperature and reduce an error in the flow rate due to the response delay even when the fluid temperature abruptly changes.

Furthermore, because the sub-heating resistor for heating the support member of the main heating resistor is provided, an influence from the heat conduction between the main heating resistor and the support member can be reduced and the fluid temperature and the fluid flow rate can be accurately found by a simple operation.

Moreover, because the shield plate is provided between the two heating resistors, the thermal interference and flow interference between the heating resistors can be prevented and the degradation in the measurement accuracy caused by these interferences can be prevented.

Furthermore, by setting the resistance values of the two main heating resistors to different values, a temperature difference can be made between these heating resistors even if the same voltage is applied to the heating resistors, thereby simplifying the probe structure and the control unit.

Next, the structure and operation of a thermal type flow meter according to a second embodiment of the present invention will be described using FIG. 15 to FIG. 17.

First, the structure of a probe PR for flow rate measurement used in the thermal type flow meter according to this embodiment will be described using FIGS. 15A and 15B.

FIG. 15A is a plan view showing the structure of the probe for flow rate measurement used in the thermal type flow meter according to the second embodiment of the present invention. Note that the same reference numeral as that of FIG. 3 denotes the same portion.

FIG. 15A illustrates a planar shape of the probe, and FIG. 15B shows a temperature distribution of the probe.

In the probe PR of this embodiment, two main heating resistors MH1, MH2 and one sub-heating resistor SH are coaxially arranged, and these are integrally formed by being coupled by lead wires LD and covered with a coating glass CG.

By applying a voltage between the lead wire LD1 and the lead wire LD2, the main heating resistor MH1 is heated. By applying a voltage between the lead wire LD3 and the lead wire LD4, the main heating resistor MH2 is heated. By applying a voltage between the lead wire LD5 and the lead wire LD6, the sub-heating resistor SH is heated.

FIG. 15B shows a temperature distribution in an axial direction of the probe. The temperature of the main heating resistor MH1 is set slightly higher than the temperature of the main heating resistor MH2. Furthermore, the temperature of the sub-heating resistor SH is set slightly higher than the temperature of the main heating resistor MH1. A setting temperature $T_{m2}$ of the second main heating resistor MH2 is 600° C., for example, and a setting temperature $T_{m1}$ of the first main heating resistor MH1 is 650° C., for example. Moreover, a setting temperature $T_s$ of the sub-heating resistor SH is 680° C., for example.

This is to prevent the transport of heat to the main heating resistors MH due to heat conduction between each main heating resistor MH and the corresponding lead wire LD. By setting the temperature $T_{m1}$ of the main heating resistor MH1 slightly higher than the temperature $T_{m2}$ of the main heating resistor MH2, the temperature gradient at a boundary (point "A") between the main heating resistor MH2 and the lead wire LD becomes approximately zero, thereby eliminating the heat flow between the main heating resistor MH2 and the lead wire LD. Likewise, by setting the temperature $T_s$ of the sub-heating resistor SH slightly higher than the temperature $T_{m1}$ of the main heating resistor MH1, the temperature gradient at a boundary (point "B") between the main heating resistor MH1 and the lead wire LD becomes approximately zero, thereby eliminating the heat flow between the main heating resistor MH1 and the lead wire LD.

Note that the structure of the sensor control unit SCU of the thermal type flow meter according to this embodiment is the same as that shown in FIG. 5. However, since there is only one sub-heating resistor, only the first sub-heating resistor control unit HCUS1 of FIG. 5 is used and the second sub-heating resistor control unit HCUS2 is not required.

Moreover, a method of setting the temperature of the heating resistor in the heating resistor control unit HCU of the thermal type flow meter according to this embodiment is the same as that of FIG. 9. Furthermore, a method of calculating a gas temperature and a gas flow rate in the sensor control unit SCU of the thermal type flow meter according to this embodiment is the same as that of FIG. 10.

Next, a state in which the thermal type flow meter according to this embodiment is mounted on an exhaust pipe of an engine will be described using FIG. 16 and FIG. 17.

FIG. 16 is a side view of a partial cross section showing a state in which the thermal type flow meter according to the second embodiment of the present invention is mounted on an exhaust pipe of an engine. FIG. 17 is a perspective view of a sensor of the thermal type flow meter according to the second embodiment of the present invention. Note that the same reference numeral as that of FIG. 15 denotes the same portion.

The probe according to this embodiment is preferably provided inside a sub-passage to prevent an influence from the turbulence of fluid (turbulent flow), the contamination or damage by oil, water, dust, or the like. For this reason, the probe of this embodiment is mounted on an exhaust pipe of an engine by being attached to an interior of the sub-passage.

The flow rate sensor of this embodiment includes the integral-type probe PR shown in FIG. 15 and a cover CV of the prove PR. In the cover CV of the probe PR, a surface Si facing a downflow direction GF of the gas and a part So of the bottom surface are opened. The gas flowing in the downflow direction enters a sub-passage (a bypass passage) BY from the Si, passes through the surface of the probe PR, and exits from the opening So in the bottom surface. When the gas flows in the backflow direction, the gas is less likely to enter the sub-passage BY because the opening So is present in the bottom surface. In other words, the probe PR detects the gas flow in the downflow direction and is less likely to detect the gas flow in the backflow direction, thereby preventing the detection accuracy of the flow rate from degrading due to the backflow. Moreover, the introduction of the gas into the narrow sub-passage inside the cover is effective to control the gas flow, and as a result, the turbulence or ripple in the gas can be reduced and the detection accuracy can be improved. More-over, by suppressing the turbulence in the gas, the adhesion of oil or water or the collision of dusts such as carbon to the probes can be reduced.

As described above, according to this embodiment, the fluid temperature is calculated using two heating resistors set to different temperatures, and then a fluid flow rate is found using the fluid temperature. Thereby, it is not necessary to acquire a difference between the temperatures of the two heating resistors in calculating the fluid temperature and the fluid flow rate. As a result, an error in the detected flow rate can be reduced even when the setting temperatures of the two heating resistors are close to each other.

Moreover, since there is no need to obtain the fluid temperature using a temperature measuring resistor that is not heated by energization, it is possible to reduce the response delay in detecting the temperature and reduce an error in the flow rate due to the response delay even when the fluid temperature abruptly changes.

Furthermore, by providing the sub-heating resistor for heating the support member of the main heating resistor, an influence from the heat conduction between the main heating resistor and the support member can be reduced and the fluid temperature and the fluid flow rate can be accurately found by a simple operation.

Moreover, because just one probe for detecting the gas temperature and the gas flow rate is required, the installation of a probe into a gas passage is facilitated. Additionally, the projected area becomes smaller and this makes it possible to decrease the pressure drop in the passage and to decrease the cost.

Furthermore, by setting the resistance values of the two main heating resistors to different values, a temperature difference can be made between these heating resistors even if the same voltage is applied to the heating resistors, thereby simplifying the probe structure and the control unit.

Next, the structure and operation of a thermal type flow meter according to a third embodiment of the present invention will be described using FIG. 18 and FIG. 19.

First, the structure of a probe PR for flow rate measurement used in the thermal type flow meter according to this embodiment will be described using FIGS. 18A and 18B.

Figure 18A:
FIG. 18A is a plan view showing a structure of a probe for flow rate measurement used in a thermal type flow meter according to a third embodiment of the present invention.

FIG. 18A is a plan view showing the structure of the probe for flow rate measurement used in the thermal type flow meter according to the third embodiment of the present invention. Note that the same reference numeral as that of FIG. 15 denotes the same portion.

Figure 18B:
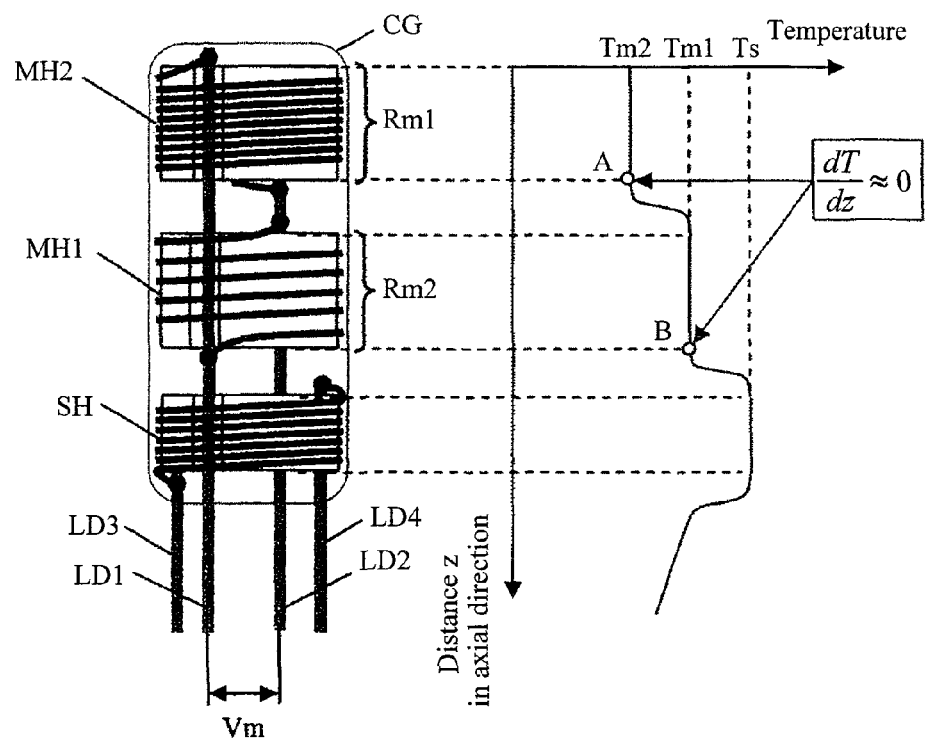
FIG. 18B shows a temperature distribution of the probe.

FIG. 18A shows a planar shape of the probe, and FIG. 18B shows a temperature distribution of the probe.

In the probe of this embodiment, two main heating resistors MH1, MH2 and one sub-heating resistor SH are coaxially arranged, and these are integrally formed by being coupled by lead wires LD and covered with a coating glass CG.

The probe in this embodiment differs from the probe shown in FIG. 15 in that the lead wire LD1 and the lead wire LD2 are shared by the main heating resistor MH1 and the main heating resistor MH2. Specifically, by applying a voltage between the lead wire LD1 and the lead wire LD2, the main heating resistor MH1 and the main heating resistor MH2 are applied with the same voltage and are thereby heated. By applying a voltage between the lead wire LD3 and the lead wire LD4, the sub-heating resistor SH is heated.

The number of turns of a resistance coil for the main heating resistor MH1 and that for the main heating resistor MH2 are different from each other, and the number of turns of the resistance coil for the main heating resistor MH2 is more than the number of turns of the resistance coil for the heating resistor MH1. Both of the cross-section areas of the resistance coils are the same. As a result, a resistance value $R_{m2}$ of the main heating resistor MH2 is larger than a resistance value $R_{m1}$ of the main heating resistor MH1. Each of the resistance values is adjusted so that a ratio of the resistance $R_{m1}$ to the resistance $R_{m2}$, i.e., $CR=R_{m1}/R_{m2}$, may become a predetermined value.

Among a voltage $V_m$ to be applied to the main heating resistor MH1 and main heating resistor MH2, the resistance value $R_{m1}$ of the main heating resistor MH1, and a heat generation amount $W_{m1}$, there is a relationship of Formula (10) below.

Formula 10

$$W_{m1} = \frac{V_m^2}{R_{m1}} \quad (10)$$

Likewise, among the voltage $V_m$ to be applied to the main heating resistor MH1 and main heating resistor MH2, the resistance value $R_{m2}$ of the main heating resistor MH2, and a heat generation amount $W_{m2}$, there is a relationship of Formula (11) below.

Formula 11

$$W_{m2} = \frac{V_m^2}{R_{m2}} \quad (11)$$

As apparent from Formula (10) and Formula (11), the main heating resistor MH1 having a smaller resistance value will have a larger heat generation amount. As a result, as shown in FIG. 18B, a temperature $T_{m1}$ of the main heating resistor MH1 becomes higher than a temperature $T_{m2}$ of the main heating resistor MH2. Moreover, a temperature $T_s$ of the sub-heating resistor SH is set so as to be higher than the temperature $T_{m1}$ of the main heating resistor MH1. Because the temperature $T_{m1}$ of the main heating resistor MH1 is set higher than the temperature $T_{m2}$ of the main heating resistor MH2, the temperature gradient at a boundary (point "A") between the main heating resistor MH2 and the lead wire becomes approximately zero, thereby eliminating the heat flow between the main heating resistor MH2 and the lead wire. Because the temperature $T_s$ of the sub-heating resistor SH is set slightly higher than the temperature $T_{m1}$ of the main heating resistor MH1, the temperature gradient at a boundary (point "B") between the main heating resistor MH1 and the lead wire becomes approximately zero, thereby eliminating the heat flow between the main heating resistor MH1 and the lead wire. This eliminates the heat transfer between each main heating resistor and the corresponding lead wire, thereby reducing the detection error of the gas temperature and gas flow rate.

Note that, even if the number of turns of the resistance coil for the main heating resistor MH1 and that for the main heating resistor MH2 are set the same and further the cross-section area of the coil of the main heating resistor MH2 is set smaller than the cross-section area of the coil of the main heating resistor MH1, the resistance value $R_{m2}$ of the main heating resistor MH2 can be made larger than the resistance value $R_{m1}$ of the main heating resistor MH1, thereby obtaining the same effect.

Other than this, conceivable methods of making the resistance value of the main heating resistor MH2 larger than that of the main heating resistor MH1 include: a method of changing the diameter of a supporting substrate around which the resistance coil is wound; a method of changing the material of the heating resistors so as to have different electric resistance; and the like.

Note that, the structure of the sensor control unit SCU of the thermal type flow meter according to this embodiment is the same as that shown in FIG. 5. However, since the main heating resistor MH1 and the main heating resistor MH2 are heated from the same power supply, only the first main heating resistor control unit HCUM1 of FIG. 5 is used and the second main heating resistor control unit HCUM2 is not required. Note that, since the structure of the main heating resistor control unit HCUM slightly differs from the one shown in FIG. 6, this structure will be described later using FIG. 19. Moreover, since there is only one sub-heating resistor, only the first sub-heating resistor control unit HCUS1 of FIG. 5 is used and the second sub-heating resistor control unit HCUS2 is not required.

Next, the structure of a heating resistor-control unit HCU used in the sensor control unit SCU of the thermal type flow meter according to this embodiment will be described using FIG. 19. FIG. 19 is a block diagram showing the structure of the heating resistor control unit HCU used in the sensor control unit SCU of the thermal type flow meter according to the third embodiment of the present invention. Note that the same reference numeral as that of FIG. 18 denotes the same portion.

In this embodiment, in order to calculate the gas temperature and the gas flow rate, the temperature of the main heating resistor needs to be detected. As described above, there is the relationship shown in Formula (2) between the temperature and resistance value of the heating resistor, so the temperature of the heating resistor can be detected by detecting the resistance value of the heating resistor.

Figure 19:
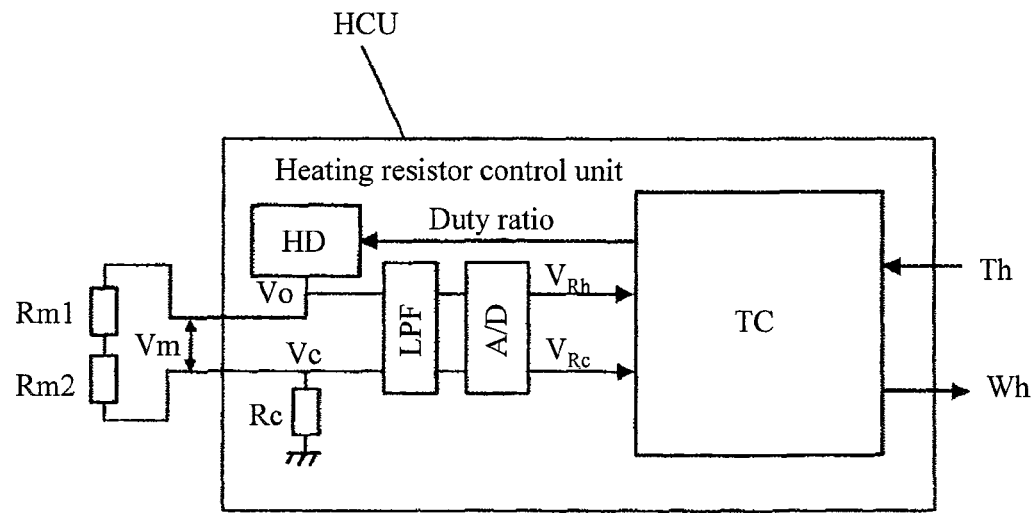
FIG. 19 is a block diagram showing a structure of a heating resistor control unit used in a sensor control unit of the thermal type flow meter according to the third embodiment of the present invention.

As shown in FIG. 19, in the heating resistor control unit HCU, if an output voltage from a heater driving unit HD is represented by Vo, a voltage across a main heating resistor Rm1 and a main heating resistor Rm2 is represented by $V_m$, and a voltage across a fixed resistor Rc is represented by $V_{RC}$, then a resistance value $R_{m1}$ of the main heating resistor Rm1 can be found from Formula (12) to Formula (16) below using Ohm's Law.

Formula 12

$$i = \frac{V_{RC}}{R_C} \quad (12)$$

Formula 13

$$V_m = V_o - V_{RC} \quad (13)$$

Formula 14

$$R_{m1} + R_{m2} = \frac{V_m}{i} \quad (14)$$

Formula 15

$$C_R \equiv \frac{R_{m1}}{R_{m2}} \quad (15)$$

Formula 16

$$R_{m1} = \frac{V_m}{i(1 + 1/C_R)} \quad (16)$$

By substituting the resistance value $R_{m1}$ into Formula (14), a resistance value $R_{m2}$ of the main heating resistor Rm2 can be found. The temperatures of the main heating resistors Rm1, Rm2 can be found from these resistance values.

Moreover, power supply values $W_{m1}$, $W_{m2}$ to the main heating resistors can be found from Formulae (17), (18), respectively.

Formula 17

$$W_{m1} = i^2 R_{m1} \quad (17)$$

Formula 18

$$W_{m2} = i^2 R_{m2} \quad (18)$$

Moreover, a method of setting the temperature of the heating resistor in the heating resistor control unit HCU of the thermal type flow meter according to this embodiment is the same as that of FIG. 9. Furthermore, a method of calculating the gas temperature and the gas flow rate in the sensor control unit SCU of the thermal type flow meter according to this embodiment is the same as that of FIG. 10.

Figure 17:
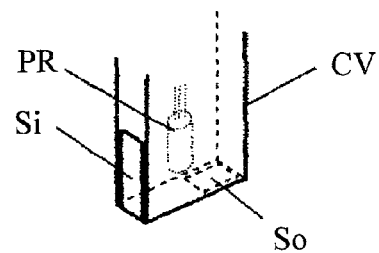
FIG. 17 is a perspective view of a sensor of the thermal type flow meter according to the second embodiment of the present invention.

Additionally, the state in which the thermal type flow meter according to this embodiment is mounted on an exhaust pipe of an engine is the same as that of FIG. 16 and FIG. 17.

As described above, according to this embodiment, the fluid temperature is calculated using two heating resistors set to different temperatures, and then the fluid flow rate is found using the fluid temperature. Thereby, it is not necessary to acquire a difference between the temperatures of the two heating resistors in calculating the fluid temperature and the fluid flow rate. As a result, an error in the detected flow rate can be reduced even when the setting temperatures of the two heating resistors are close to each other.

Moreover, since there is no need to obtain the fluid temperature using a
temperature measuring resistor that is not heated by energization, it is possible to reduce the response delay in detecting the temperature and reduce an error in the flow rate due to the response delay even when the fluid temperature abruptly changes.

Furthermore, by providing the sub-heating resistor for heating the support member of the main heating resistor, an influence from the heat conduction between the main heating resistor and the support member can be reduced and the fluid temperature and the fluid flow rate can be accurately found by a simple operation.

Moreover, because just one probe for detecting the gas temperature and the gas flow rate is required, the installation of the probe into a gas passage is facilitated. Additionally, the projected area becomes smaller and this makes it possible to decrease the pressure drop in the passage and to decrease the cost.

Further, since the lead wires for applying a voltage to the two main heating resistors are shared, the number of lead wires can be reduced and thus the manufacturing cost of the probe can be reduced. Furthermore, since the two main heating resistors can be controlled by one heating resistor control unit, advantages such as cost reduction and miniaturization of the device can be achieved.

Figure 20:
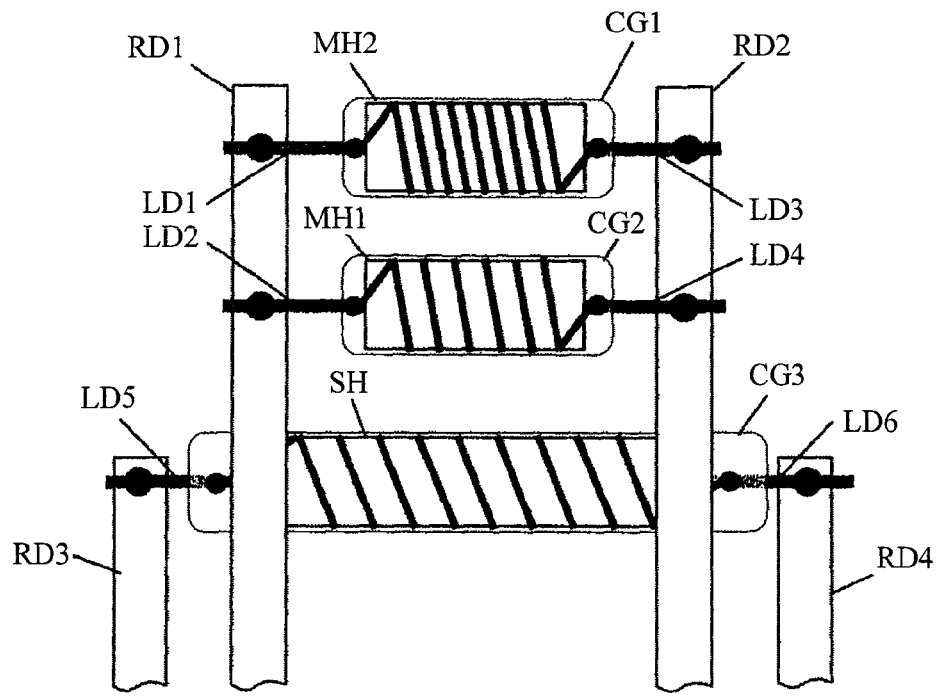
FIG. 20 is a plan view showing a structure of a probe for flow rate measurement used in a thermal type flow meter according to a fourth embodiment of the present invention.
Figure 21:
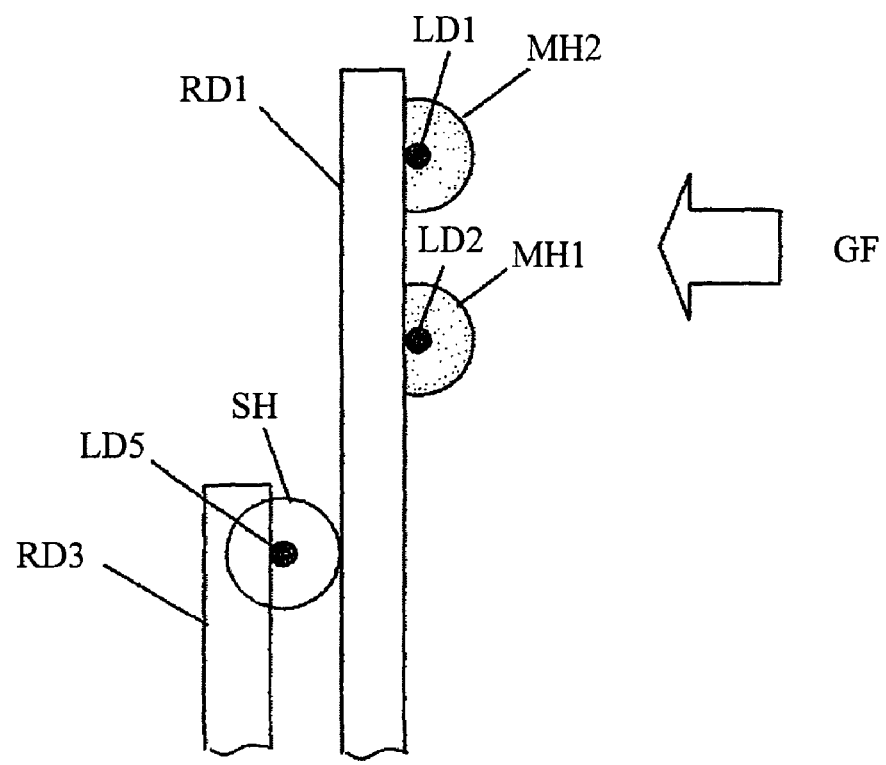
FIG. 21 is a side view showing the structure of the probe for flow rate measurement used in the thermal type flow meter according to the fourth embodiment of the present invention.

Next, the structure and operation of a thermal type flow meter according to a fourth embodiment of the present invention will be described using FIG. 20 and FIG. 21. FIG. 20 is a plan view showing the structure of a probe for flow rate measurement used in the thermal type flow meter according to the fourth embodiment of the present invention. FIG. 21 is a side view showing the structure of the probe for flow rate measurement used in the thermal type flow meter according to the fourth embodiment of the present invention. Note that the same reference numeral as that of FIG. 15 denotes the same portion.

As shown in FIG. 20, in this embodiment, a main heating resistor MH1 and a main heating resistor MH2 are arranged in parallel. The main heating resistor MH1, the main heating resistor MH2, and a sub-heating resistor SH are each configured by winding a platinum resistance wire around a supporting substrate such as an alumina substrate and coating these with glass. Lead wires of the main heating resistors are welded to conductive support members RD1, RD2. One lead wire LD2 of the main heating resistor MH1 and one lead wire $\overline{LD1}$ of the main heating resistor MH2 are connected to the support member RD 1. Likewise, the other lead wire LD4 of the main heating resistor MH1 and the other lead wire LD3 of the main heating resistor MH2 are connected to the support member RD2. By applying a voltage between the support member RD1 and the support member RD2, the main heating resistor MH1 and main heating resistor MH2 are applied with the same voltage and are thereby heated. The lead wires LD5, LD6 of the sub-heating resistor SH are welded to conductive support members RD3, RD4, respectively. By applying a voltage between the support member RD3 and the support member RD4, the sub-heating resistor SH is applied with the voltage and is thereby heated. The voltage value applied between the support member RD3 and the support member RD4 is determined so that the temperature of the sub-heating resistor SH may be slightly higher than the temperature of the main heating resistor MH2.

As shown in FIG. 21, the sub-heating resistor SH is attached so as to contact the support members RD1, RD2 of the main heating resistors. In other words, the support members RD1, RD2 of the main heating resistors can be hearted by heating the sub-heating resistor SH.

Moreover, as shown in FIG. 21, the sub-heating resistor SH is preferably provided at the downstream side in a flow direction of the support members of the main heating resistors. This is because, if the flow direction is disturbed by the sub-heating resistor SH or if a fluid heated by the sub-heating resistor SH flows through the surface of the main heating resistors, then this leads to a detection error of the flow rate or temperature.

The number of turns of a resistance coil for the main heating resistor MH1 and that for the main heating resistor MH2 are different from each other, and the number of turns of a resistance coil for the main heating resistor MH2 is more than the number of turns of a resistance coil for the heating resistor MH1. Both of the cross-section areas of the resistance coils are the same. As a result, a resistance value $R_{m2}$ of the main heating resistor MH2 is large than a resistance value $R_{m1}$ of the main heating resistor MH1.

In the probe in this embodiment, because the support members of the main heating resistors are heated by the sub-heating resistor, the amount of heat that is transmitted and radiated from the main heating resistors through the lead wires and support members can be eliminated. Moreover, a relationship of (temperature of main heating resistor MH2)< (temperature of main heating resistor MH1)<(temperature of sub-heating resistor SH) is held among the temperatures of the heating resistors. Because the temperature of the main heating resistor MH1 is set higher than the temperature of the main heating resistor MH2, the temperature gradient at a boundary between the main heating resistor MH2 and the lead wire becomes approximately zero, thereby eliminating the heat flow between the main heating resistor MH2 and the lead wire. Because the temperature of the sub-heating resistor SH is set slightly higher than the temperature of the main heating resistor MH1, the temperature gradient at a boundary between the main heating resistor MH1 and the lead wire becomes approximately zero, thereby eliminating the heat flow between the main heating resistor MH1 and the lead wire. This eliminates the heat transfer between each main heating resistor and the corresponding lead wire, thereby reducing a detection error of the gas temperature and gas flow rate.

Note that the structure of the sensor control unit SCU of the thermal type flow meter according to this embodiment is the same as that shown in FIG. 5. However, since the main heating resistor MH1 and the main heating resistor MH2 are heated from the same power supply, only the first main heating resistor control unit HCUM1 of FIG. 5 is used and the second main heating resistor control unit HCUM2 is not required. Note that the structure of the main heating resistor control unit HCUM is the same as that shown in FIG. 19. Moreover, since there is only one sub-heating resistor, only the first sub-heating resistor control unit HCUS1 of FIG. 5 is used and the second sub-heating resistor control unit HCUS2 is not required.

Moreover, a method of setting the temperature of the heating resistor in the heating resistor control unit HCU of the thermal type flow meter according to this embodiment is the same as that of FIG. 9. Furthermore, a method of calculating the gas temperature and the gas flow rate in the sensor control unit SCU of the thermal type flow meter according to this embodiment is the same as that of FIG. 10.

Additionally, the state in which the thermal type flow meter according to this embodiment is mounted on an exhaust pipe of an engine is the same as that of FIG. 16 and FIG. 17.

As described above, according to this embodiment, the fluid temperature is calculated using two heating resistors set to different temperatures, and then the fluid flow rate is found using the fluid temperature. Thereby, it is not necessary to acquire a difference between the temperatures of the two heating resistors in calculating the fluid temperature and the fluid flow rate. As a result, an error in the detected flow rate can be reduced even when the setting temperatures of the two heating resistors are close to each other.

Moreover, since there is no need to obtain the fluid temperature using a temperature measuring resistor that is not heated by energization, it is possible to reduce the response delay in detecting the temperature and reduce an error in the flow rate due to the response delay even when the fluid temperature abruptly changes.

Furthermore, by providing the sub-heating resistor for heating the support member of the main heating resistor, an influence from the heat conduction between the main heating resistor and the support member can be reduced and the fluid temperature and the fluid flow rate can be accurately found by a simple operation.

Moreover, since the lead wires for applying a voltage to the two main heating resistors are shared, the number of lead wires can be reduced and thus the manufacturing cost of the probe can be reduced. Further, since the two main heating resistors can be controlled by one heating resistor control unit, advantages such as cost reduction and miniaturization of the device can be achieved.

Furthermore, since both ends of each of the main heating resistors and the sub-heating resistor are supported by the support members, the mechanical strength of the heating resistors can be increased. Namely, the thermal type flow meter of this embodiment has such a structure that the heating resistors, the lead wires, and the support members are less likely to be deformed or damaged by a fluid force, a vibration, or the like. The thermal type flow meter of this embodiment can maintain high reliability in the measurement in flow fields with high temperature where there are a lot of ripples or dusts in the gas, in particular as in an exhaust gas from an engine.

EXPLANATION OF REFERENCE NUMERALS

BA . . . supporting substrate, BY . . . sub-passage, CG . . . coating glass, SCU . . . sensor control circuit, CV . . . cover of probe, ECU . . . engine control unit, HO . . . groove provided in supporting substrate, IP . . . shield plate, LD . . . lead wire, MH . . . main heating resistor, PB . . . probe base, PI . . . exhaust gas passage, PR . . . probe, RD . . . support member, SH . . . sub-heating resistor, TC . . . temperature control unit, Tm . . . temperature of main heating resistor, Ts . . . temperature of sub-heating resistor, Wm . . . heat generation amount of main heating resistor

What is claimed is:

1. A thermal type flow meter, comprising:
   a first main heating resistor;
   a second main heating resistor set at a temperature different from that of the first main heating resistor;
   at least one sub-heating resistor for heating lead wires of the two main heating resistors;
   a temperature calculating means for determining a temperature of a fluid by using the two main heating resistors; and
   a flow rate calculating means for determining a flow rate of the fluid by using at least one of the two main heating resistors.

2. The thermal type flow meter according to claim 1, wherein the flow rate calculating means determines the fluid flow rate by using the fluid temperature determined by the temperature calculating means and at least one of the temperatures of the two main heating resistors.

3. The thermal type flow meter according to claim 2, wherein the flow rate calculating means determines the fluid flow rate by using the temperature of the main heating resistor having a higher setting temperature.

4. The thermal type flow meter according to claim 1, wherein,
   of the two main heating resistors, one has a lower setting temperature, and the other has a higher setting temperature;
   the main heating resistor having the lower setting temperature is set at a temperature that is higher than a fluid temperature by at least a predetermined amount, and
   the main heating resistor having the higher setting temperature is set at a temperature that is lower than a predetermined upper limit temperature.

5. The thermal type flow meter according to claim 1, wherein
   the at least one sub-heating resistor includes
   a first sub-heating resistor for heating the support member of the first main heating resistor; and
   a second sub-heating resistor for heating the support member of the second main heating resistor; and
   a temperature of the first sub-heating resistor is set higher than a temperature of the first main heating resistor while a temperature of the second sub-heating resistor is set higher than a temperature of the second main heating resistor.

6. The thermal type flow meter according to claim 5, wherein
   the first main heating resistor and the first sub-heating resistor are supported on a first probe at one side, and the second main heating resistor and the second sub-heating resistor are supported on a second probe at one side; and the first and second probes are arranged in parallel with respect to a flow of the fluid, and are inserted into the fluid from one side of a fluid passage.

7. The thermal type flow meter according to claim 6, further comprising a shield plate arranged in the flow direction between the two first and second probes.

8. The thermal type flow meter according to claim 7, wherein the shield plate is thin on an upstream side of the flow and is thick in a vicinity of the probes.

9. The thermal type flow meter according to claim 1, wherein
- the first and second main heating resistors and one sub-heating resistor are included in a probe that is supported by lead wires;
- the support members are connected to a sensor control unit,
- the at least one sub-heating resistor, the first main heating resistor, and the second main heating resistor are arranged in this order when viewed from the sensor control unit side, and
- a relationship of (a setting temperature of the sub-heating resistor)>(a setting temperature of the first main heating resistor)>(a setting temperature of the second main heating resistor) is established among the setting temperatures of these heating resistors.

10. The thermal type flow meter according to claim 9, wherein
- the first and second main heating resistors share positive and negative electrodes, and
- an electrical resistance value of the second main heating resistor is larger than an electrical resistance value of the first main heating resistor.

11. The thermal type flow meter according to claim 9, wherein the first main heating resistor and the second main heating resistor of the probe are arranged in parallel with respect to a flow of the fluid, and the probe is inserted into the fluid from one side of a fluid passage.

* * * * *